(12) United States Patent
Shaikh et al.

(10) Patent No.: US 10,169,169 B1
(45) Date of Patent: Jan. 1, 2019

(54) HIGHLY AVAILABLE TRANSACTION LOGS FOR STORING MULTI-TENANT DATA SETS ON SHARED HYBRID STORAGE POOLS

(71) Applicant: CISCO TECHNOLOGY, INC., San Jose, CA (US)

(72) Inventors: Faraz Shaikh, Sunnyvale, CA (US); Sandip Agarwala, Cupertino, CA (US); Abhishek Chaturvedi, Mountain View, CA (US); Shravan Gaonkar, Gainesville, FL (US); Mallikarjunan Mahalingam, Cupertino, CA (US); Smit Shah, Sunnyvale, CA (US); Mayuresh Vartak, San Jose, CA (US); Praveen Vegulla, Cupertino, CA (US); Krishna Yadappanavar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 335 days.

(21) Appl. No.: 14/273,462

(22) Filed: May 8, 2014

(51) Int. Cl.
*G06F 11/14* (2006.01)
*G06F 17/30* (2006.01)

(52) U.S. Cl.
CPC .... *G06F 11/1474* (2013.01); *G06F 17/30575* (2013.01)

(58) Field of Classification Search
CPC ......... G06F 17/30575; G06F 17/30174; G06F 17/30371; G06F 17/30864
USPC ........................................................ 707/634
See application file for complete search history.

(56) References Cited

U.S. PATENT DOCUMENTS

| | | | |
|---|---|---|---|
| 6,985,937 B1 | 1/2006 | Keshav | |
| 7,236,966 B1 | 6/2007 | Jackson | |
| 8,010,509 B1 * | 8/2011 | Khurana | G06F 11/2064 707/690 |
| 8,204,859 B2 * | 6/2012 | Ngo | G06F 11/1471 707/639 |
| 8,775,861 B1 | 7/2014 | Raizen | |
| 8,793,373 B2 | 7/2014 | Nakama | |
| 8,996,614 B2 | 3/2015 | Choudhary | |
| 9,092,290 B1 | 7/2015 | Bono | |
| 2001/0052073 A1 | 12/2001 | Kern et al. | |
| 2002/0165961 A1 * | 11/2002 | Everdell | H04L 41/22 709/225 |
| 2003/0014599 A1 | 1/2003 | McBreatry et al. | |

(Continued)

OTHER PUBLICATIONS

VMWare Virtual SAN Hardware Guidance—VMWare, Jun. 2009 https://www.vmware.com/files/pdf/products/vsan/VMware-TMD-Virtual-SAN-Hardware-Guidance.pdf.

(Continued)

*Primary Examiner* — Hosain T Alam

(57) ABSTRACT

Creating and using highly available transaction logs in a distributed storage system is described, where the storage controller functions of the distributed storage system are separated from that of distributed storage system storage media. In an exemplary embodiment, a storage controller server receives a transaction entry at a first storage pool of the distributed storage system. The storage controller server further looks up a transaction log to store the transaction entry, where the transaction log is associated with a second storage pool. The storage controller server routes the transaction entry to the second storage pool, wherein the second storage pool stores the transaction entry.

16 Claims, 28 Drawing Sheets

(56) References Cited

U.S. PATENT DOCUMENTS

| | | | |
|---|---|---|---|
| 2003/0189930 A1 | 10/2003 | Terrell et al. | |
| 2005/0108593 A1 | 5/2005 | Purushothaman | |
| 2005/0268054 A1 | 12/2005 | Werner et al. | |
| 2007/0220059 A1* | 9/2007 | Lu | G06F 17/30368 |
| 2011/0022566 A1* | 1/2011 | Beaverson | G06F 17/30097 |
| | | | 707/639 |
| 2011/0258480 A1 | 10/2011 | Young et al. | |
| 2011/0307736 A1* | 12/2011 | George | G06F 17/30519 |
| | | | 714/6.2 |
| 2012/0117246 A1 | 5/2012 | Pujolle | |
| 2012/0198152 A1* | 8/2012 | Terry | G06F 11/1092 |
| | | | 711/114 |
| 2012/0203825 A1 | 8/2012 | Choudhary | |
| 2012/0221774 A1* | 8/2012 | Atkisson | G06F 12/0802 |
| | | | 711/103 |
| 2012/0233463 A1* | 9/2012 | Holt | G06F 17/30575 |
| | | | 713/168 |
| 2012/0233668 A1* | 9/2012 | Leafe | G06F 9/5022 |
| | | | 726/4 |
| 2012/0254269 A1* | 10/2012 | Carmichael | G06F 17/30094 |
| | | | 707/827 |
| 2012/0260037 A1* | 10/2012 | Jibbe | G06F 11/1076 |
| | | | 711/114 |
| 2012/0278512 A1 | 11/2012 | Alatorre et al. | |
| 2012/0303999 A1* | 11/2012 | Calder | G06F 11/1471 |
| | | | 714/6.3 |
| 2014/0122795 A1 | 5/2014 | Chambliss | |
| 2014/0164621 A1 | 6/2014 | Nakama | |
| 2015/0039717 A1 | 2/2015 | Chiu et al. | |

OTHER PUBLICATIONS

"The Case for Persistent Full Clones," Deepstorage.net, http://getgreenbytes.com/wp-content/uploads/2013/05/FULL_CLONE_PERSISTENT_VDI-FINAL.pdf, 18 pages.

Rodeh, Ohad, "B-trees, Shadowing, and Clones," ACM Transactions on Storage.

(TOS) 3, No. 4, https://www.usenix.org/legacy/events/lsf07/tech/rodeh.pdf, (2008), 51 pages.

Rodeh, Ohad, "B-trees, Shadowing, and Clones," ACM Transactions on Computational Logic, vol. V, No. N, (Aug. 2007), 26 pages.

\* cited by examiner

| NAME 701 | PREFERRED STORAGE 702 | TOTAL KEYSIZE 703 | MAX VALUE SIZE 704 | NAMED BYTES 705 | SHARES 707 | FIXED DLOG ID 709 |
|---|---|---|---|---|---|---|
| DATA NAMED 711 | ROTATING DISK | 64 | 4K | 2 | 98 | FALSE |
| METADATA HYBRID 712 | SOLID STATE DISK | 64 | 1K | 2 | 98 | TRUE |
| CACHE FIXED 713 | SOLID STATE DISK | 64 | 1K | 0 | 100 | TRUE |

FIGURE 7

HIGHLY AVAILABLE TRANSACTION LOGS FOR STORING MULTI-TENANT DATA SETS ON SHARED HYBRID STORAGE POOLS

RELATED APPLICATIONS

Applicant claims the benefit of priority of prior, provisional application Ser. No. 61/739,685, filed Dec. 19, 2012, the entirety of which is incorporated by reference.

FIELD OF INVENTION

This invention relates generally to a storage system and more particularly to creating and using highly available transaction logs in a distributed storage system.

BACKGROUND OF THE INVENTION

Enterprise storage systems currently available are proprietary storage appliances that integrate the storage controller functions and the storage media into the same physical unit. This centralized model makes it harder to independently scale the storage systems' capacity, performance and cost. Users can get tied to one expensive appliance without the flexibility of adapting it to different application requirements that may change over time. For small and medium scale enterprise, this may require huge upfront capital cost. For larger enterprise datacenters, new storage appliances are added as the storage capacity and performance requirements increase. These operate in silos and impose significant management overheads.

These enterprise storage systems can store data as key-value pairs, where a key is a reference for the data and the value is the data to be stored. Current implementation of a key-value pairs, however, do not lend themselves to supporting multiple data-sets each backed by and independent policy varying in availability, performance, storage placement, storage format, indexing, and consistency guarantees. In addition, a key-value pair does not handle supporting virtualization that separates data sets and their physical location mapping. Such mechanisms, if it exists, would apply to all data in the system (e.g., selective data sets cannot be moved around). In addition, there is no implementation that provides for named/unnamed writes that co-exists in the same system.

Furthermore, current enterprise storage systems implementations do not optimize on key-value cardinality properties. For example, the system were to use an "existing" key values store, that system will not be able to optimize on the cardinality property of the system's use case (using a key value store to build a filesystem.) Thus, if keys have one to one mapping to values, certain operations pertaining to consistency, availability and repair can be heavily simplified and optimized. However, if the keys have a one-to-many relationship to values, then extra effort has to be made, to provide consistency availability and repair guarantees. In addition, a log system, that has insight about the key being accessed has a one-to-one relationship with a value, can provide fast path access to keys without going through reconcile step required for keys with one-to-many relationships.

SUMMARY OF THE DESCRIPTION

Creating and using highly available transaction logs in a distributed storage system is described, where the storage controller functions of the distributed storage system are separated from that of distributed storage system storage media. In an exemplary embodiment, a storage controller server receives a transaction entry at a first storage pool of the distributed storage system. The storage controller server further looks up a transaction log to store the transaction entry, where the transaction log is associated with a second storage pool. The storage controller server routes the transaction entry to the second storage pool, wherein the second storage pool stores the transaction entry.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 7 is an illustration of one embodiment of a key space property table.

DETAILED DESCRIPTION

Figure 1:
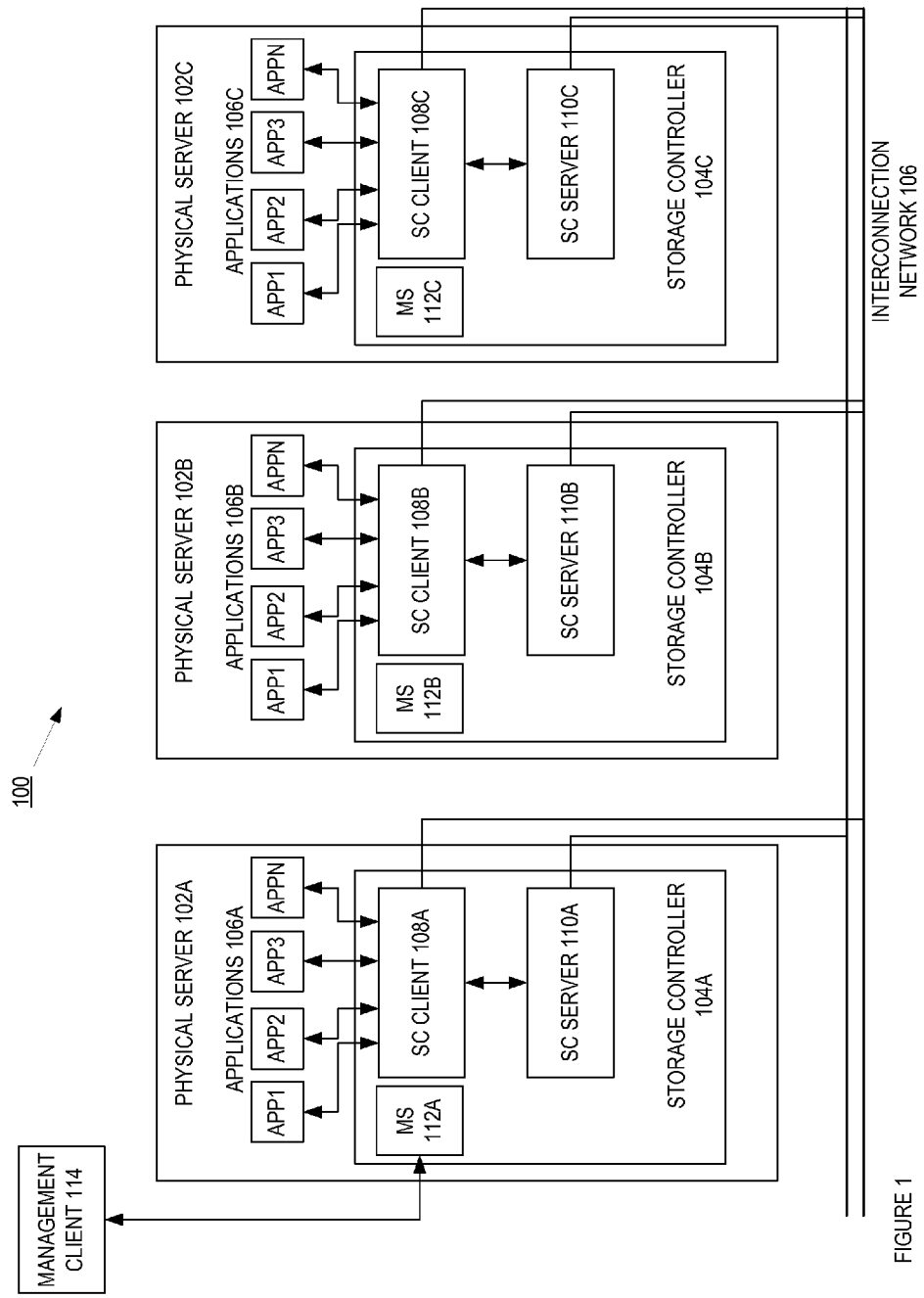
FIG. 1 is an illustration of one embodiment of a high-level view of StorFS system.

Creating and using highly available transaction logs in a distributed storage system is described, where the storage controller functions of the distributed storage system are separated from that of distributed storage system storage media. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

Creating and using highly available transaction logs in a distributed storage system is described, where the storage controller functions of the distributed storage system are separated from that of distributed storage system storage media. In one embodiment, the StorFS system includes a set of highly available transaction logs that allow the system to stores transaction updates of the StorFS system. In one embodiment, a transaction log is a history of actions executed by the StorFS system to enable atomicity, consistency, isolation, and durability properties over crashes or hardware failures. Physically, a log is a file of updates done to the database, stored in stable storage. In one embodiment, an algorithmic abstraction of a highly available transaction log is described. This algorithmic abstraction can be implemented in a multitude of form factors varying in software/hardware combinations (e.g., all hardware, all software, or a mixture of hardware and software). In one embodiment, the transaction log stores transaction updates of the StorFS system in key value tuple format (e.g., writes of objects to the StorFS system, creation of an object, deletion of an object, changes or updates to objects, object rename, and/or another operation on an object. In one embodiment, the use and format of the key-value is left up to the client of the transaction log.

In one embodiment, the highly available transaction logs include low overhead multi-instance logs that can co-exist and be driven in parallel on a shared non-volatile storage pool that includes of storage containers with different latency, bandwidth, access granularity and capacity characteristics. In addition, the highly available transaction logs can support separate availability, consistency, and reliability policies for each log within the same storage pool. These highly available transaction logs are self-contained and include pluggable indexing, value format transducers, repair mechanisms, and re-sync mechanisms. In one embodiment, the information to perform the above operations is self-contained in the transaction log itself. In one embodiment, a keyspace is a schema definition of a table. For example and in one embodiment, there is a separate table schemas for describing filesystem data, metadata, cache, and system logs. In one embodiment, a keyspace is not as expressive as a database schema, where the keyspace provides single value tables that are indexed by a key. In this embodiment, the key size, maximum value size and preferred storage type (e.g., SSD, HDD, Flash) are specified in these tables. These logs further support the notion of keyspaces which describe, properties of keys such as: key→value cardinality; key type [named/unnamed/hybrid]; preferred access pattern (e.g., sequential or random); and storage quota/reservation for the set of keys in the keyspace. In one embodiment, consulting properties described above and optimize steps for transaction commit/lookup, log repair. Consulting the above properties to provide quota/service level agreement (SLA)/availability guarantees to the keys in the different keyspaces. In one embodiment, multi-tenancy is provided by attributes of logs that fall under a keyspace. For example and in one embodiment, there is a file group that uses two-way mirroring. In this example, when the StorFS stores the metadata in the metadata keyspace, the StorFS system searches for logs that have two-way mirroring. In addition, when the StorFS system stores the data, the data keyspace will search for logs that have one-way mirroring.

In one embodiment, the logs are individually tunable consistency and availability guarantees at a keyspace/log level. In addition, the logs support strong consistency and availability guarantees (e.g., no partitioning support) during the following operations: re-syncing, adding, and/or removing replicas; re-balance, moving full replicas around; repairing; cleaning and/or moving transactions within a log.

In one embodiment, the transaction log abstraction allows for multi-instance low overhead logs. In this embodiment, a multitude of the transaction logs can co-exist and be driven in parallel within a StorFS system enclosure to form a higher level system abstraction that provides service which involve accessing/storing/synchronizing multitude of these distributed logs. In another embodiment, the transaction log abstraction has the ability to coexist over shared data storage platform. Such logs have many to one relationship with physical/logical storage containers in the form of persistent/non-volatile storage mediums.

In addition, and in another embodiment, the transaction log abstraction supports named/un-named and hybrid key formats that allow client of the log take control of storage placement of keys. Such a mechanism can help (but not limited in use) to co-locate transaction logs that are related on temporal/spatial access plane.

In another embodiment, the transaction log abstraction allow for the availability of the logs to 1–N copies. In this embodiment, the logs are kept in sync via a replication algorithm, that orders single copy strong consistency guarantees for transactions. In a further embodiment, the transaction log abstraction allows for the ability to change the availability properties of a log on the fly, where by clients can reduce replica range to [1, (N–k)] or [1,(N+K)]. In a still further embodiment, the transaction log abstraction allows for the ability to independently move the replicas from one storage medium to another, and maintain strongly consistent availability guarantees while the movement is in progress. In another embodiment, the transaction log abstraction allows for the ability to select any single replica to serve as a head for reading existing transaction logs and writing out new transaction logs. Such a feature can be used to (but not limited in use) load balance storage access workload on the underlying storage medium.

In one embodiment, the transaction log abstraction includes policies to provide custom availability semantics when logs copies are in accessible. In another embodiment, the transaction log abstraction includes self-contained recovery logic, that remembers the active history and carries forward delete history. In this embodiment, the log is capable reconciling itself with its copies. In a further embodiment, the transaction log abstraction includes self-contained error detection and repair logic. If access to a transaction log fails, the log is capable of self-healing. The healing process provided strong consistency guarantees for accesses during the repair duration.

In one embodiment, the transaction log abstraction includes a self-contained passive monitoring of stored transaction state to protect against silent corruptions on the persistent/volatile storage. In a further embodiment, the transaction log abstraction includes a self-contained pluggable support for an indexing mechanism to provide quick access to transactions lookup via keys. In another embodiment, the transaction log abstraction includes support for movement of transaction log, from one storage location to the other while maintaining strong consistency guarantees, and/or support for pluggable storage transducers to transform values that are stored in the transaction entry. In this embodiment, such transducers are used to (but not limited) independently provide data services and manage their respective semantics for services like compression, encryption. Such transducers can store cookie information is the transactions entry to provide selective services to selected keys, or temporarily enable/disable services at a log level granularity. In a further embodiment, the transaction log abstraction includes a pluggable efficient on wire/storage format for describing transaction entries and a manifestation of storage formats that is designed to efficiently manage variable page size addressable storage mediums, example but not limited solid state disk, rotating disk.

FIG. 1 is an illustration of one embodiment of a high-level view of StorFS system 100. In FIG. 1, the StorFS system 100 includes storage nodes 102A-C coupled by an interconnection network 116. While in one embodiment, three storage nodes 102A-C are illustrated as part of the StorFS system 100, in alternate embodiments, there can be more or less storage nodes. For example and in one embodiment, the StorFS system 100 can include up to several hundred storage nodes. In one embodiment, each storage node 102A-C includes a storage controller (SC) client (also called dispatcher) 108A-C, a storage controller (SC) server 110A-C, or both. The SC servers 110A-C manage their underlying storage (e.g., Hard disk drive (HDD), Solid state drives (SSD), PCIe flash, etc.) and collectively provide reliable and unified storage functionality to the SC clients. The SC client 108A-C processes input/output (I/O) requests from the applications that are local to its physical storage node and routes them to the appropriate SC servers for processing. For example and in one embodiment, SC client 108A can send an I/O request locally to SC Server 110A and/or remotely to SC Servers 110B or 110C. The system is capable of exposing many different interfaces to the application like file (e.g. NFS, CIFS), object, key-value, or another type of interface. In one embodiment, the storage node 102A-C can be server, blade server, personal computer, or any other type of device capable of storing data. In one embodiment, the management server 112A-C is an agent that is used to communicate system management data and commands regarding the corresponding storage node 102A-C with the management client 114.

In one embodiment, the design of the StorFS system 100 distributes both the data and the metadata, and this system 100 does not require storing a complete global map for locating individual data blocks in our system. The responsibility of managing metadata is offloaded to each individual storage nodes 102A-C. In one embodiment, a cluster manager (CRM) resides on each SC Server 110 maintains some global metadata, which is small compared to the local metadata. In one embodiment, each logical file (or entity) is partitioned into equal sized "stripe units". The location of a stripe unit is determined based on a mathematical placement function Equation (1):

$$\text{Virtual\_Node\#} = \text{Hash}(\text{Entity}_{Id}, \text{Stripe\_Unit\#}) \% \text{Total\_Vitual\_Nodes} \quad (1)$$

$$\text{Stripe\_Unit\#} = \frac{\text{offset}}{\text{Stripe\_Unit\_Size}} \% \text{Stripe\_Unit\_Per\_Stripe}$$

The $\text{Entity}_{Id}$ is an identification of a storage entity that is to be operated upon, the Total_Virtual_Nodes is the total number of virtual nodes in the StorFS system 100, the offset is an offset into the storage entity, and the Stripe_Unit_Size is the size of each stripe unit in the StorFS system 100. The value Stripe_Unit_Per_Stripe is described further below. In one embodiment, the storage entity is data that is stored in the StorFS system 100. For example and in one embodiment, the storage entity could be a file, an object, key-value pair, etc. In this example, the $\text{Entity}_{Id}$ can be an iNode value, a file descriptor, an object identifier, key/value identifier, etc. In one embodiment, an input to a storage operation is the $\text{Entity}_{Id}$ and the offset (e.g., a write, read, query, create, delete, etc. operations). In this embodiment, the $\text{Entity}_{Id}$ is a globally unique identification.

In one embodiment, the StorFS 100 system receives the $\text{Entity}_{Id}$ and offset as input for each requested storage operation from an application 106A-C. In this embodiment, the StorFS system 100 uses the offset to compute a stripe unit number, Stripe_Unit#, based on the stipe unit size, Stripe_Unit_Size, and the number of virtual nodes that the entity can be spread across, Stripe_Unit_Per_Stripe. Using the stripe unit number and the entity identifier ($\text{Entity}_{Id}$), the StorFS system 100 computes the virtual node identifier. As described below, the StorFS system 100 uses a hash function to compute the virtual node identifier. With the virtual node identifier, the StorFS 100 can identify which physical node the storage entity is associated with and can route the request to the corresponding SC server 110A-C.

In one embodiment, each vNode is a collection of either one or more data or metadata objects. In one embodiment, the StorFS system 100 does not store data and metadata in the same virtual node. This is because data and metadata may have different access patterns and quality of service (QoS) requirements. In one embodiment, a vNode does not span across two devices (e.g. a HDD). A single storage disk of a storage node 102A-C may contain multiple vNodes. In one embodiment, the placement function uses that a deterministic hashing function and that has good uniformity over the total number of virtual nodes. A hashing function as known in the art can be used (e.g., Jenkins hash, murmur hash, etc.). In one embodiment, the "Stripe_Unit_Per_Stripe" attribute determines the number of total virtual nodes that an entity can be spread across. This enables distributing and parallelizing the workload across multiple storage nodes (e.g., multiple SC servers 110A-C). In one embodiment, the StorFS system 100 uses a two-level indexing scheme that maps the logical address (e.g. offset within a file or an object) to a virtual block address (VBA) and from the VBAs to physical block address (PBA). In one embodiment, the VBAs are prefixed by the ID of the vNode in which they are stored. This vNode identifier (ID) is used by the SC client and other StorFS system 100 components to route the I/O to the correct cluster node. The physical location on the disk is determined based on the second index, which is local to a physical node. In one embodiment, a VBA is unique across the StorFS cluster, where no two objects in the cluster will have the same VBA.

In one embodiment, the cluster manager (CRM) maintains a database of virtual node (vNode) to physical node (pNode) mapping. In this embodiment, each SC client and server caches the above mapping and computes the location of a particular data block using the above function in Equation (1). In this embodiment, the cluster manager need not be consulted for every I/O. Instead, the cluster manager is notified if there is any change in 'vNode' to 'pNode' mapping, which may happen due to node/disk failure, load balancing, etc. This allows the StorFS system to scale up and parallelize/distribute the workload to many different storage nodes. In addition, this provides a more deterministic routing behavior and quality of service. By distributing I/Os across different storage nodes, the workloads can take advantage of the caches in each of those nodes, thereby providing higher combined performance. Even if the application migrates (e.g. a virtual machine migrates in a virtualized environment), the routing logic can fetch the data from the appropriate storage nodes. Since the placement is done at the stripe unit granularity, access to data within a particular stripe unit goes to the same physical node. Access to two different stripe units may land in different physical nodes. The striping can be configured at different level (e.g. file, volume, etc.) Depending on the application settings, the size of a stripe unit can range from a few megabytes to a few hundred megabytes. In one embodiment, this can provide a good balance between fragmentation (for sequential file access) and load distribution.

Figure 2:
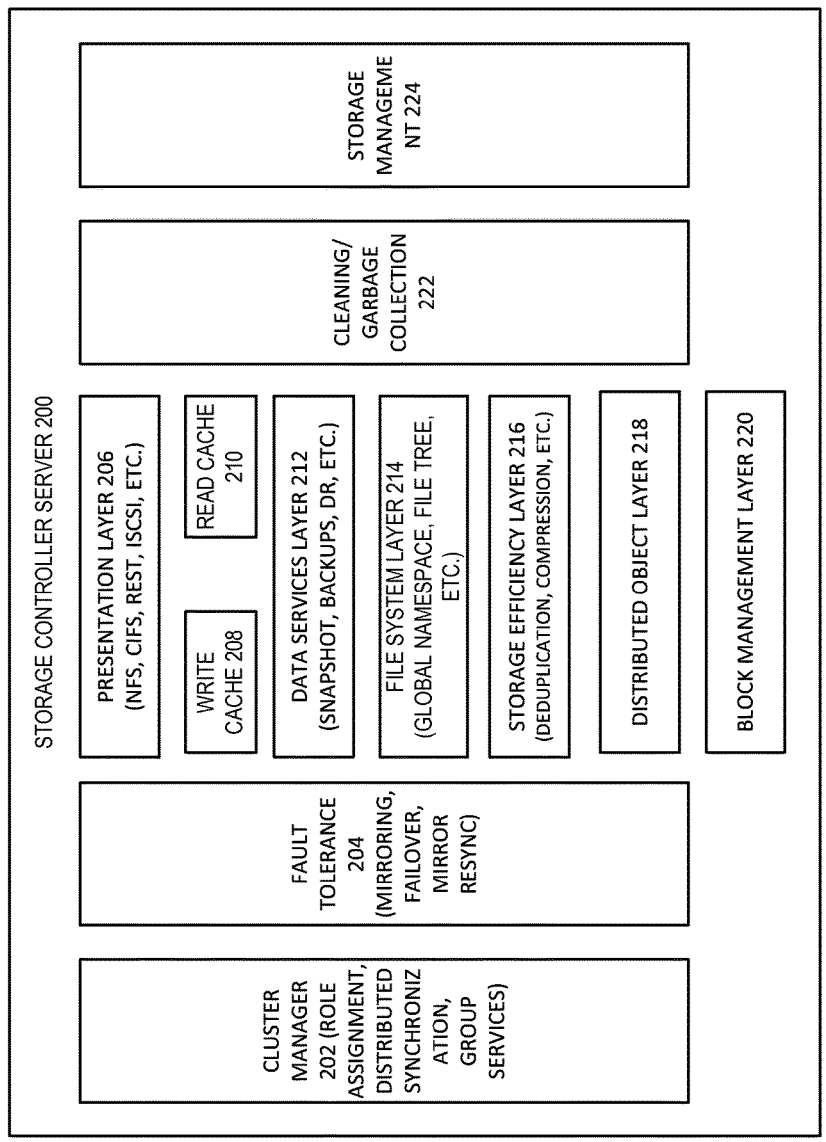
FIG. 2 is an illustration of one embodiment of a system including some of the components that comprises the storage controller server.

FIG. 2 is a block diagram of one embodiment of a storage control server 200. In one embodiment, the Block Management Layer 220 of the storage control server is responsible for formatting, allocating, and freeing storage in fixed block sizes. This layer provides access to different kinds of storage (e.g. SSD, HDD, etc.) in the system. In one embodiment, the Distributed Object Layer 218 of the storage control server uses an API of the Block Management Layer 220 to provide a global distributed object namespace that is accessible over the network. In one embodiment, the Storage Efficiency Layer 216 reduces the size of data footprint on the physical medium using techniques like compression, deduplication, etc. The reduction is achieved without deteriorating the performance or the reliability of the data storage. In one embodiment, the File System Layer 214 provides a logical global namespace abstraction to organize and locate data in the cluster. In one embodiment, the Data Service Layer 212 provides enterprise data services like disaster recovery, fine grained policy management, snapshots/clones, etc. In one embodiment, the Write Cache 208 and the Read Cache 210 Layers provide acceleration for write and read I/O respectively using fast storage devices. In one embodiment, the Write Cache Layer 208 includes the write log as described below. In one embodiment, the Presentation Layer 206 provides an interface to access the StorFS storage using well-known standard protocols like NFS, CIFS, REST, iSCSI, etc. In one embodiment, the Cluster Manager (CRM) Layer 202 is responsible for the coordination across distributed StorFS components, delegating responsibilities and maintaining a consistent global state of the system. In one embodiment, the Fault Tolerance Layer 204 is responsible for resiliency and making sure that the data is available and consistent even after the failure of a software or hardware component (disk, server, network, etc.). In one embodiment, the Garbage Collection Layer 222 is responsible for reclaiming dead space that result due to entities getting deleted or updated. This layer efficiently determines the storage blocks that are not used (or referenced) and makes them available for new data to be written. In one embodiment, the Storage Management Layer 224 provides a framework to configure, monitor, analyze and report on the operation of the overall StorFS cluster storage system as well as individual logical and physical entities in the cluster. In one embodiment, each of the layers mentioned above are fully distributed and each layer does not rely on any centralized components for their operations.

Figure 3:
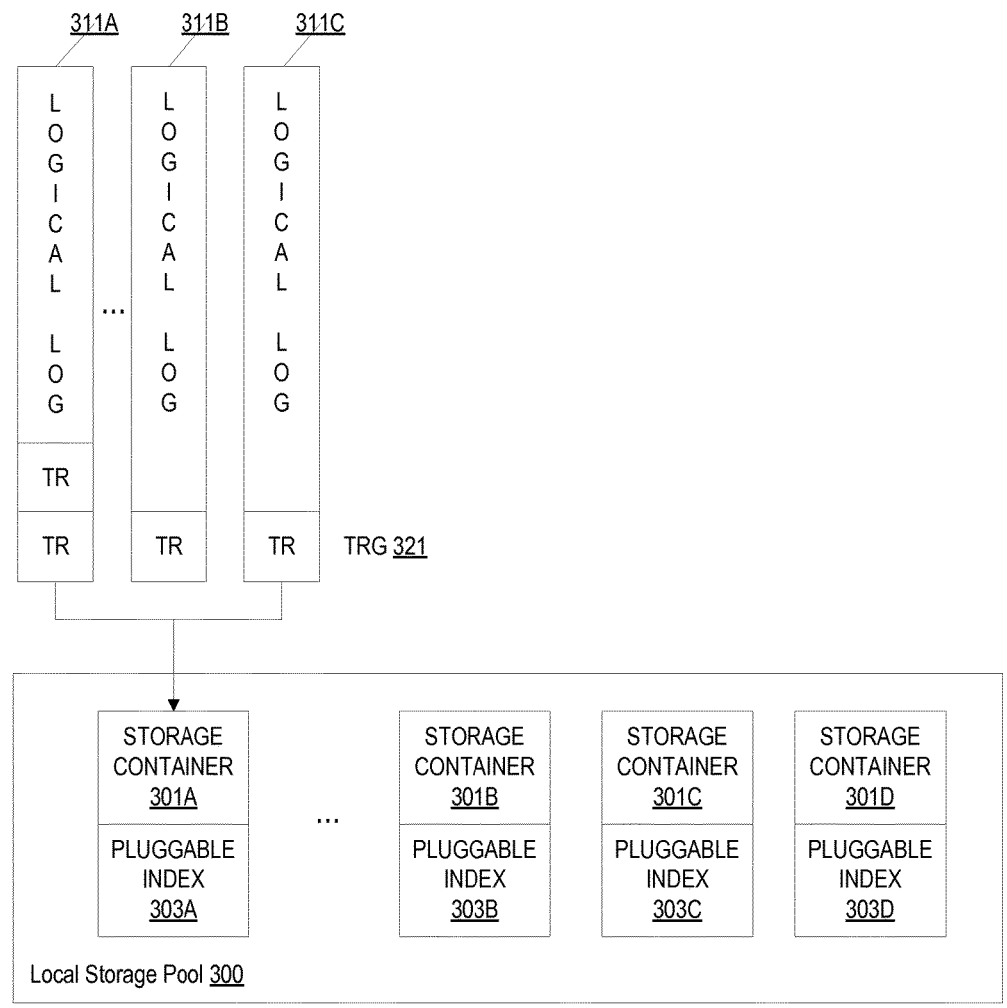
FIG. 3 is an illustration of one embodiment of a logical single copy log abstraction build over storage pool.

FIG. 3 is an illustration of one embodiment of a logical single copy log abstraction 311A-311C build over storage pool. In one embodiment, the logical single copy log abstraction 311A-311C includes the logical transition group (TRG) 321 that are abstracted on top of the local storage pool 300.

In one embodiment, a data persistence layer for enterprise storage systems consists of a grouping of individual logical storage containers that act as unit for failure, management, procurement, and/or a combination thereof. At the atomic level, a storage container exhibits the same properties like naming, interconnect, access granularity, cost per TOP, cost per space unit, latency, durability, bandwidth and other characteristics. Manifestation of such a storage container can be a hard drive, solid state disk, memory chip, and/or a combination thereof. Such storage containers can host data in a volatile or non-volatile fashion. In one embodiment, persistent storage solutions employ non-volatile storage containers. Solutions that do not have persistence requirement can be built on non-volatile storage containers. In one embodiment, a storage container refers to any such storage unit or combination of storage units.

In one embodiment, the local storage pool 300 includes multiple storage containers 301A-D and pluggable indices 303A-D. In one embodiment, a storage solution that caters to a multitude of data access patterns, possibly but not always coming from a multi tenant client data hosting solution, can be built using combining a group of storage containers into a storage pool, which forms a higher level abstraction that simplifies, management, packing, and handling of a group of storage containers. A manifestation of this storage pool can be a just a bunch of disk (JBOD), or a grouping that in combination alters the storage access characteristics (described in 1) of the underlying storage containers (e.g., redundant array of independent disks (RAID), logical volume management (LVM), or replicated groups). In one embodiment, each storage pool 300 can be one or more hard drive, solid state drive, chip memory, and/or a combination thereof. In one embodiment, local storage pools also need contain logic in hardware and software to weave together storage containers. This logic can be embedded in the container and is further described below. For example and in one embodiment, the logic weaves together storage containers, and provides software defined storage configuration options that can allow differentiated storage service level agreements for multiple clients tenant using the storage pool. In one embodiment, the pluggable index 303A-D is an index that is optimized for the use of this index. In this embodiment, an index is a full system that can be optimized and implemented very differently based on: (i) data structure and layout used to exploit access patterns; and (ii) data transforms used based on knowledge of what is stored in the index. In addition, the logging system has abstracted the interfaces needed from an index that allows an index implementation that provides the interface can be used. For example and in one embodiment, the StorFS system can use no index (e.g., the data set is small and detailed such that a cache client can implement an efficient indexing by themselves), an SDD index (e.g., the data set is large and on an SSD, the SSD cache uses an index), and a full in-memory index (e.g., a fast in-memory index based on hash tables for small data sets, that can economically fit in main memory).

In one embodiment, a storage pool logic component is responsible to partition or group smaller storage units across storage containers into logically block addressable (LBA) containers. It is important to note that the storage container is a logically block addressable space. In one embodiment, any number or amount of virtualization abstractions can be applied to form a sub LBA container within a parent LBA container. In this embodiment, there can also be a null storage virtualization layer that provided the underlying LBA container itself as consumable entity.

In one embodiment, a logical log 311A-C is an abstraction that resembles the accounting/bookkeeping definition of "log", built over a LBA space. In a nutshell, a LBA is addressable from 0-N blocks where a log space includes a of a sparsely ordered blocks addressable space by K-L, log addressable space. In this embodiment, each LBA space is a log space, but not vice-versa. In one embodiment, a log with a capability of adjusting the starting of the addressable space can be augmented to remember history, by not reusing the same log block address again. Logic and software exist that can manage LBA spaces and log spaces. One simple manifestation of a log space is application log files on a file system, where new files are created with unique name and each log file is not rewritten. Such manifestation of log spaces can be implemented at the level of the storage virtualization hierarchy, which exports a LBA abstraction (block, LVM, file system, file in file system, file system in file). For example and in one embodiment, there can be 0-N physical blocks and they can be logically addressed from K-L range, which can be sparse (log addressable range). In this example, there are 5 (N) physical blocks, which are physical addressable from 0-4. On top of this, the StorFS system can build a log addressable space which is "sparse" can start from 200-300 [K-L], which can leads to LBA space to log addressable space map as: 0→200, 1→210, 2→220, 3→230, and 4→300.

In one embodiment, the log hosts a set of log entries, indexed by a unique key. In this embodiment, the unique key can be a monotonically increasing number, time stamp or other type of uniquely generate key. In one embodiment, an extension of unique key is a data unit that is uniquely addressable. Such unique addressing on a storage container can be trivially generated, by concatenating the address ability key of the data and a strong characterization summary of the data stored at that the location. The characterization can be the full data value itself or its cryptographic/mathematical transformation that reduces the size of the address bit and maintain a degree of collision resistance (e.g., close to 99.99%). Such mathematical transformation is described under the umbrella of hash functions (e.g., a Secure Hash Algorithm-1 (SHA-1), or another type of cryptographic hash).

As described above, a logical log 311A-C can include or be associated with a logical transaction group TRG 321. In one embodiment, a group of log entries is included in a transaction entry group TRG 321. In this embodiment, the logical transaction group 321 is used as a management unit. In addition and in another embodiment, this management unit can be sized to match the optimal access granularity of the underlying storage container. For example and in one embodiment, the StorFS uses size transaction groups to cater to any underlying storage device. One example is to size the group size to be a higher multiple by (1–N) of the highest addressable block unit in the group of storage pool. In this example, if the StorFS system groups the storage pool with storage containers with block addressable units of 4K, 8K, 32K, the StorFS system can choose transaction group size to be multiple of 32K.

Figure 4:
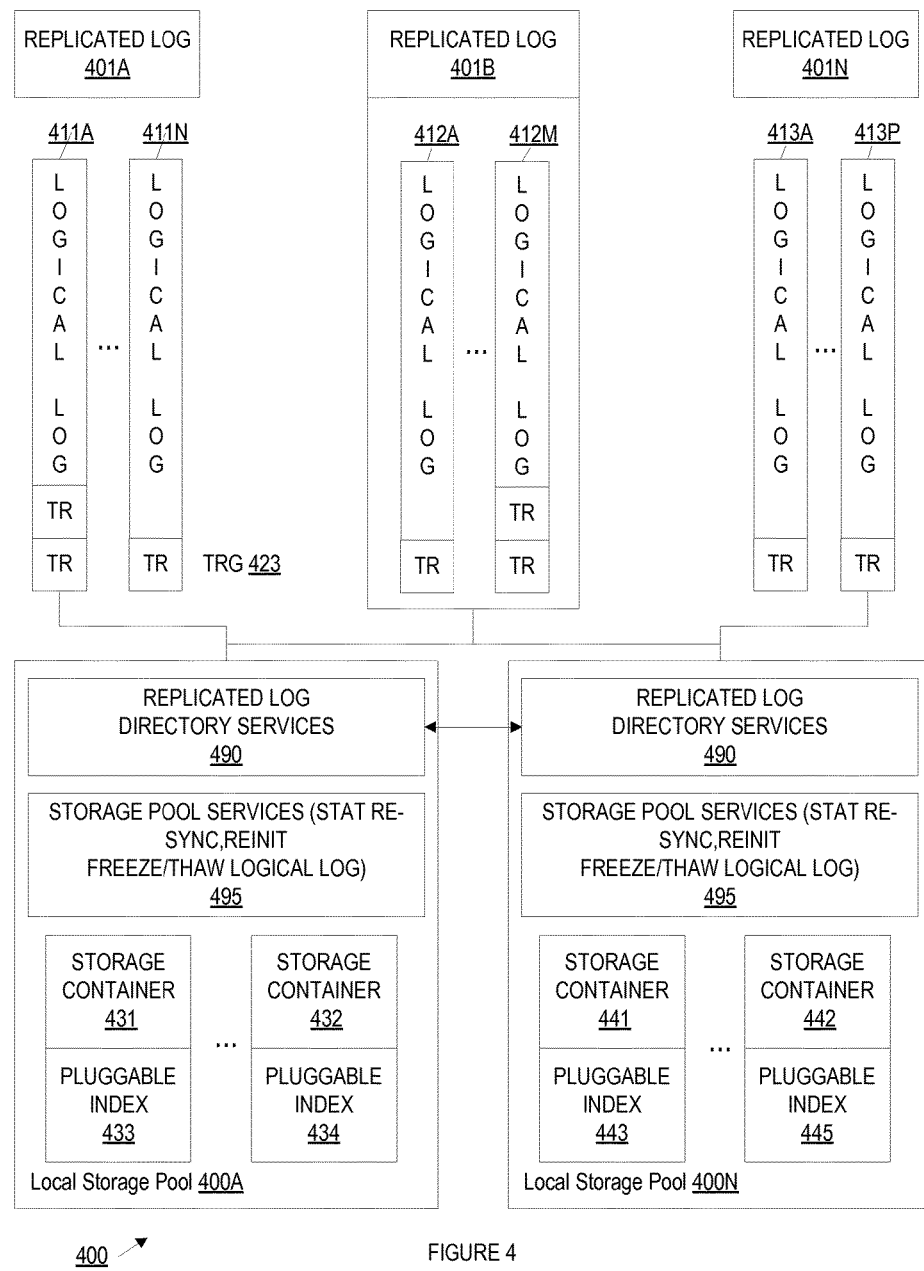
FIG. 4 is an illustration of one embodiment of replicated highly available logs stored across multiple fault domains.

FIG. 4 is an illustration of one embodiment of replicated highly available logs 401A-N stored across multiple fault domains. In one embodiment, each of the replicated logs includes logical logs. For example and in one embodiment, replicated logs 401A includes logical logs 411A-N, replicated logs 401B includes logical logs 412A-M, and replicated logs 401N includes logical logs 413A-P. In addition, several local storage pools 400A-N are illustrated in FIG. 4. Each of the local storage pools 400A-N includes storage containers 431, 432 . . . 441, 442 with corresponding pluggable indices 433, 434 . . . 443, 445. Furthermore, the local storage pools 400A-N each includes a storage pool services 495 and replicated log directory services 490.

In one embodiment, a group of logical logs can be replicated across fault domains that be demarcated by storage pools, storage containers, and/or any other logical unit of failure. In one embodiment, replication is performed across different fault domains so that a failure of a component in one domain does not impact the availability of components in other domains. A set of HDDs, server nodes, or a physical server rack are a few examples of fault domain. By using multiple fault domains, the replicated logical logs are now highly available. As described below, the StorFS system uses different techniques to efficiently keep the replicas in sync, re-sync them if they diverge, create replicas on the fly, delete replica on the fly, provide consistent view for stored transactions across replicas and other replica management work flows that are used to maintain monitor and utilize such highly available replicated logs. For example and in one embodiment, logical logs 401A and 402A are stored in local storage pool 400A and logical logs 402M and 403P are stored in local storage pool 400N.

Figure 5:
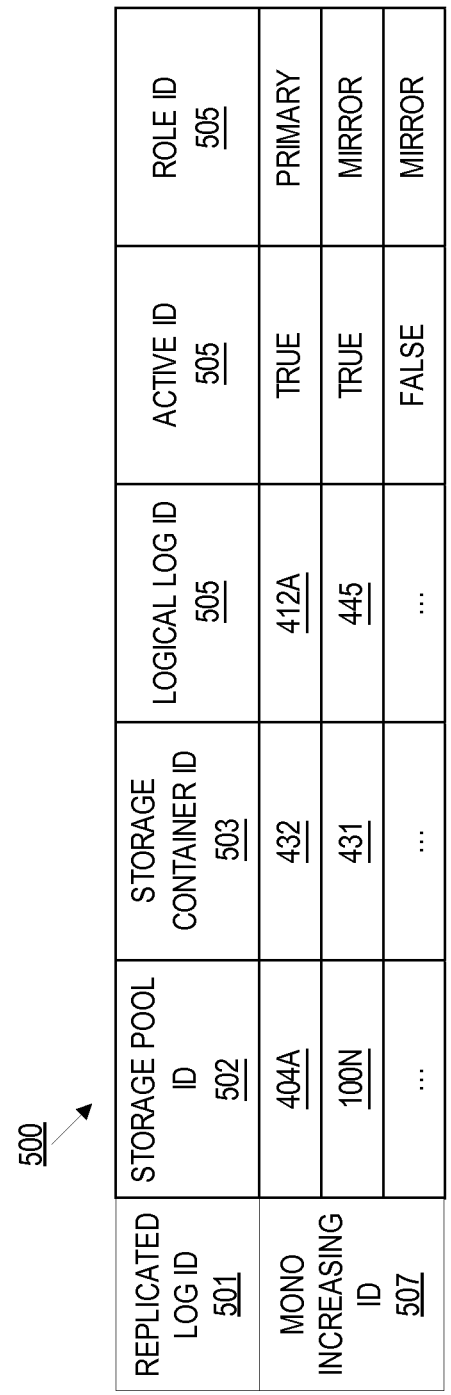
FIG. 5 is an illustration of one embodiment of a distributed log directory record.

FIG. 5 is an illustration of one embodiment of a distributed log directory record 500. Each logical log in the system described in FIG. 3 is uniquely identified with the replicated log ID 501 that specifies the storage pool ID 502, storage container ID 503, logical log ID (local to the container) 504, active ID 505, and role ID 506. In one embodiment, the replicated log ID 507 is a monotonically generated ID. In one embodiment, the storage container ID 503 identifies the storage container for the log. In one embodiment, the logical log ID 504 of that log. In one embodiment, the active ID 505 indicates whether the log is active or inactive and the role ID 506 identifies if this log is a primary or a mirror. A replicated log combines logs across multiple fault domains.

In one embodiment, logical logs that are active are binary equivalent of each other, except for the latest transaction that is allowed to be in an in-flight state. In this embodiment, inactive mirrors can be off by at least 2 transactions from the active mirrors. These properties of having at most on transaction in flight is guaranteed by "commit transaction model" described ahead. In one embodiment, the inactive replicas can have less transactions than the active replicas in cases where they go offline or a not temporarily available for some time.

In another embodiment, the inactive replicas can have more transaction than the active replicas. This is the case where the active replicas delete some transactions from the log that are no longer required. If a replica is not available when the active replicas are being cleaned, that replica might miss on delete updates to the transaction updates. In one embodiment, one logical log is chosen for the primary role, the storage pool hosting the primary is responsible coordinating updates to he the replicated log. Other replicas simply mimic updates to the primary.

In one embodiment and returning to FIG. 4 above, the log directory service 490 provides services for: (i) Lookup_Replicated Log, which looks up a replicated log directory record; (ii) Modify_Replicated Log, which modifies a state/role of a logical log within a replicated log record; and (iii) Create_Replicated Log, which creates a replicated log as a composition of unassigned logical logs. In one embodiment, the log directory service tracks assignment status of the logical logs available in the system.

In one embodiment, the storage pool service 495 provides services to control access to the logical logs. In this embodiment, an important service is the freezing and thawing of logical logs. In one embodiment, the freeze operation holds the incoming transactions and flushes the in flight transactions if any before returning. The thaw logical undoes the freeze operation allowing the logical log to accept new operations.

Figure 6:
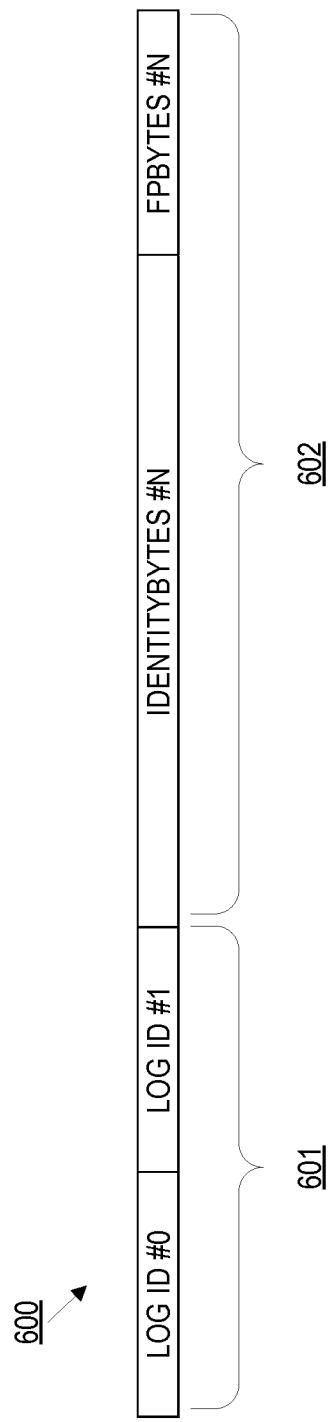
FIG. 6 is an illustration of one embodiment of a transaction entry key format.

FIG. 6 is an illustration of one embodiment of a transaction entry key format 600. In one embodiment, a transaction entry key format 600 includes the log identifiers 601 and the bytes information 602. In one embodiment, the byte information includes the identity bytes and the fingerprint bytes. In one embodiment, the fingerprint is calculated as a cryptographic hash of the value part of the key-value pair. In one embodiment, each transaction can be viewed as an opaque blob that is stored/applied to all active replicas in the replicated log. Requests for persisting/querying multiple such transaction entries can be received in parallel within/across replicated logs that may lie across storage pools. In one embodiment, transactions cannot be processed in parallel on a single replicated log, whereas multiple replicated logs can be processed in parallel.

FIG. 7 is an illustration of one embodiment of a key space property table 700. In one embodiment, the keyspace property table 700 includes columns for name 701, preferred storage 702, total key size 703, max value size 704, named bytes 705, shares 707, and fixed Dlog ID 709. Each row in the key space property table can be used to configure the different properties. For example and in one embodiment, the data named 711 has a rotating disk for preferred storage, a total key size of 64, a max value size of 4K, named bytes is 2, shares of 98, and the fixed Dlogd ID is false. In addition, the metadata hybrid 712 has a solid state disk for preferred storage, a total key size of 64, a max value size of 1K, named bytes is 2, shares of 98, and the fixed Dlogd ID is true. As another example, the cache fixed 713 has a solid state disk for preferred storage, a total key size of 64, a max value size of 1K, named bytes is 0, shares of 100, and the fixed Dlogd ID is true.

Figure 8:
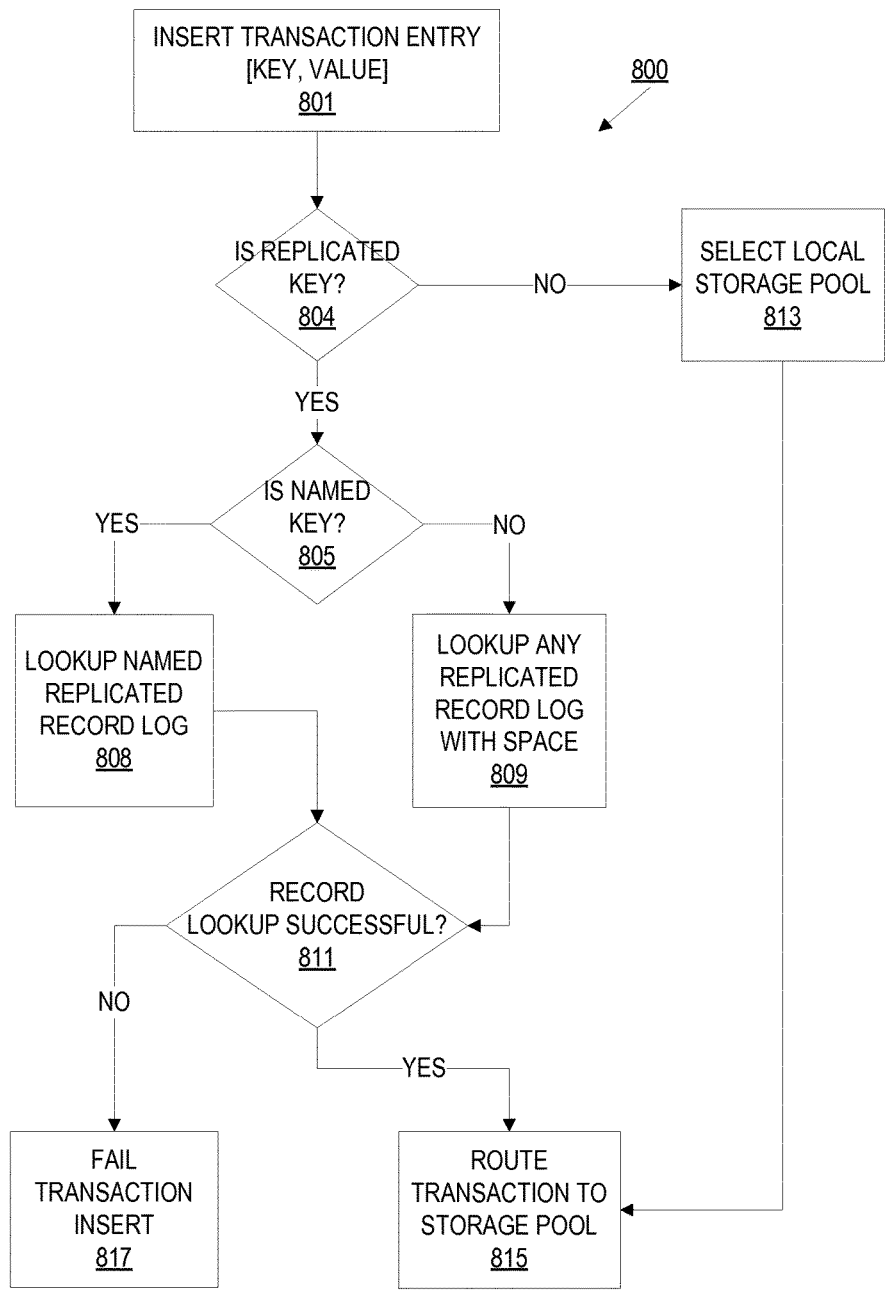
FIG. 8 is a flow diagram of one embodiment of a process to perform transaction routing.

FIG. 8 is a flow diagram of one embodiment of a process 800 to perform transaction routing. In one embodiment, the distributed object layer 218 performs process 800 for transaction routing. In one embodiment, process 800 begins by receiving transaction commit operation of block 801. In one embodiment, the transaction commit operation includes a transaction entry having a key-value pair that is used to insert the entry into the transaction log. In one embodiment, any storage container node can receive the transaction commit request. In one embodiment, any storage pool can accept the transaction request on behalf of the receiving storage pool. In this embodiment, the storage pool accepts the transaction request, looks up the receiving storage pool 501, and forwards the request to the storage pool. If accepting storage pool is same as receiving storage pool, forwarding is not required. In this embodiment, the storage pool currently hosting the current primary logical log processes the transaction.

In one embodiment, the storage Pools that are not the primary are either "forwarding storage pools," which forward the write transaction to the primary or are "mirror storage pools," which accept updates a from the primary. For example and in one embodiment, the transaction commit is initiated at the primary and the final result of the transaction is managed by the primary.

At block 804, process 800 determines if the key received in block 801 is replicated key. In one embodiment, if the key is to force to be persisted on the local storage pool, the key is queued onto the local storage pool for processing. In one embodiment, forcing or not forcing is a property of the keyspace. For example and in one embodiment, for keyspaces that hold caching information, a key is forced to be cached on the local storage pNode. For keyspaces that hold data information, a key does not need to be forced as data items can be stored anywhere and the location after being stored can be saved in metadata item. For keyspaces that hold metadata, the location cannot be changed as the metadata acts as root trackers whose position must be known.

If the received key is a replicated key, execution proceeds to block 813 below. If the key is not a replicated key, process 800 determines if this key is a named key at block 805. In one embodiment, a named key is a key that has a name previously set by the client and cannot be changed by the system. In one embodiment, a named key has some fields reserved for the required logical log ID as described above in FIG. 6. An unnamed key, on the other hand, is set by the transaction processing layer. For an unnamed key, the client specifies the values and the keys are generated as per the value that can be best stored. The client remembers the key. An unnamed key may not have fields as described in FIG.

6. In one embodiment, a full fledged hybrid key has components set by the client (e.g., fields 602) and components set by the transaction logging layer (e.g., fields 601). In one embodiment, if the key is named then the logical log ID is specified.

If the key is a named key, process 800 looks up the named value in the replicated record log at block 808. Execution proceeds to block 811 below. If the key is not a named key, process 800 looks up any replicated record log with space at block 809. In one embodiment, process 800 uses this replicated log to store the transition. At block 811, processing 800 determines if the record look up was a success whether the key is a named or unnamed ley. If the record look up was not a success, at block 817, process 800 fails the transaction insert. If the lookup was a success, the record lookup would return an indication of which storage pool is used for this entry. At block 813, process 800 selects the storage pool. At block 815, process 800 routes the transaction to that storage pool.

Figure 9:
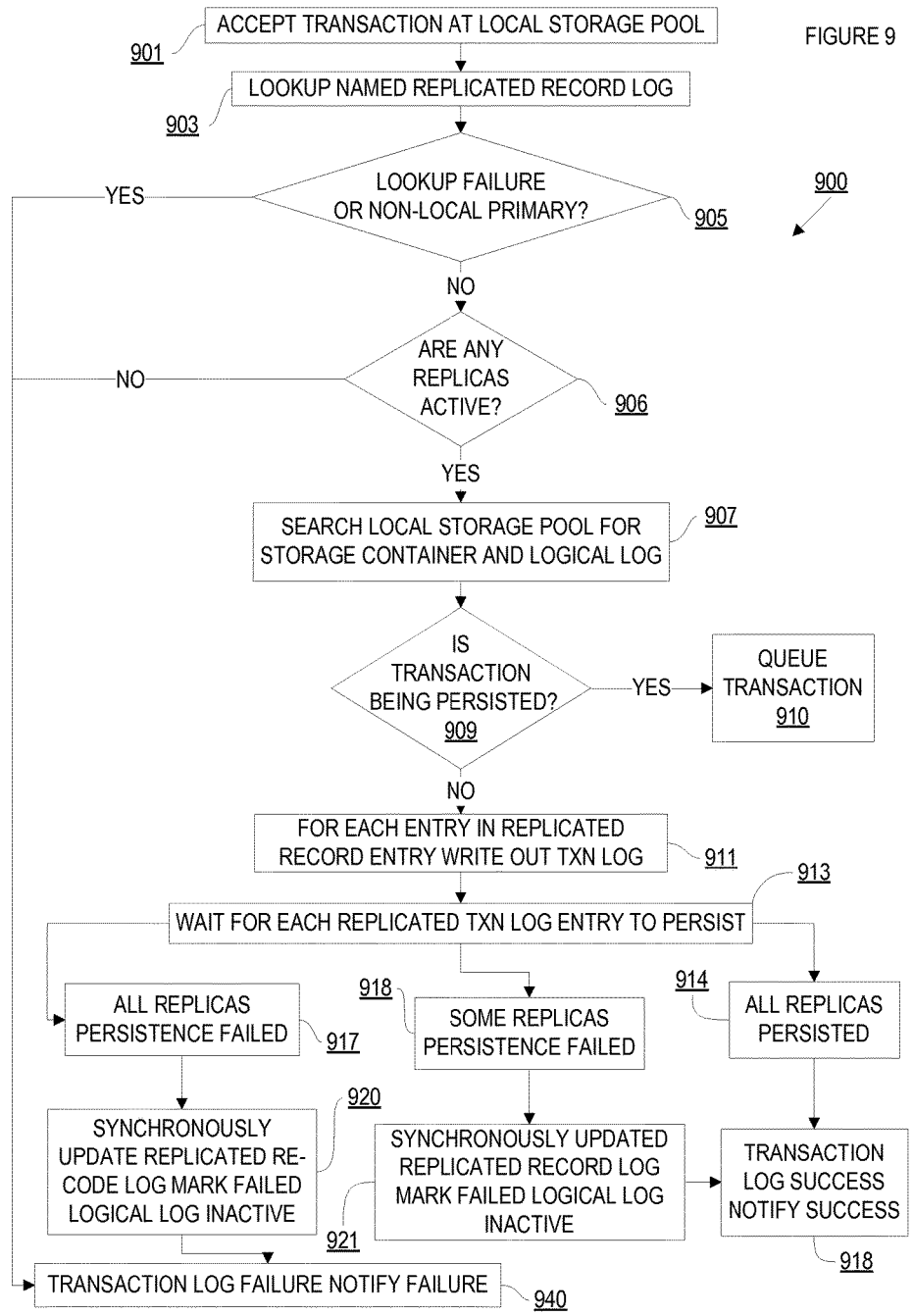
FIG. 9 is a flow diagram of one embodiment of a process to perform writing/storing a transaction record.

As described above, process 800 routes the transaction commit the correct storage pool. The storage pool receives the transaction requests and stores this transaction. FIG. 9 is a flow diagram of one embodiment of a process 900 to perform writing/storing a transaction record. In one embodiment, a storage pool performs process 900, such as the storage pool 300 as described above in FIG. 3. In FIG. 9, process 900 beings by accepting the transaction at block 901. At block 903, process 900 looks up the named replicated record log. In one embodiment, at the primary logical, the replicated record log is re-verified to guarantee that storage container still contains the designated logical log. A change in logical log can change due to multitude of reasons described below in the re-balance/repair section.

Process 900 determines if the lookup was a failure at block 905. In addition, process 900 determines if the replicative record is non-local primary. In one embodiment, a lookup failure or mismatch in primary ownership fails the transaction. If this is lookup is a failure or is a non-local primary, execution proceeds to block 940 below. If this lookup was a success or is a local primary, process 900 determines if there are any active replicas at block 906. In one embodiment, a transaction can also fail if there are no active replicas available to write. This can happen if all replicas are in accessible.

If there are no active replicas, execution proceeds to block 940 below. If there are active replicas, process 900 searches the local storage pool for the storage container and logical log at block 907. In one embodiment, process 900 uses logic on storage pool and resolves the storage container and logical log ID abstraction to process the transaction request.

At block 909, process 900 determines if the transaction is being persisted. If the transaction is being persisted, process 900 queues the transaction to the picked up as part of the next batch to be processed at block 910. In one embodiment, process 900 queues the transaction to be processed. If the transaction is not being persisted, process 900 preforms loop in which process 900 writes out the transaction log for each entry in the replicated record entry at block 911. In one embodiment, process 900 includes dispatch logic to select a number of transactions to be applied to the replicated logs. In one embodiment, there is one set of transactions out in flight. Each of the transactions are packed in a transaction group, the packing format is pluggable. The binary copy of the transaction group is shipped to all mirror replicas logs that are to be persisted.

In one embodiment, this process executed at block 911 is executed in parallel. In this embodiment, process 900 waits for each replicated transaction log entry to persist at block 913. In addition, at block 913, process 900 determines how many of the replica persistences succeeded. In one embodiment, all the replicas could be persistent, some of the replicas could fail at being persistent, and all of the replicas persistence could fail.

If all replicas are persistent, at block 914, execution proceeds to block 950 below. At block 919, some of the replicas persistence has failed and execution proceeds to block 921 below. At block 921, process 900 synchronously updates the replicated record log and marks the failed logical log as inactive. Execution proceeds to block 950 below. At block 917, process 900 determines that all of the replica persistence has failed. Execution proceeds to block 920. At block 920, process 900 synchronously updates the replicated re-code log and marks failed logical log as inactive. Execution proceeds to block 940 below. At block 940, process 900 notes the transaction log operation has failed and notifies the client of the failure. At block 950, process 900 notes that the transaction log operation is a success and notifies the client of that success.

In one embodiment, as replicas go inactive, the availability of the replicated log is affected or degraded. In this embodiment, further action on degraded replicated logs is policy driven. One such policy can be to stop taking any further updates if less than two replicas are available.

As described above, process 900 has one pending write transaction set in flight for a given vNode. In this embodiment, the primary will not generate another write until it has successfully concluded about the prior transaction. In one embodiment, each transaction update is verifiable by itself, even if mappings that are replicate directory record are corrupted or bogus, process 900 should guarantee that all logical logs of a replicated if re-composed are binary up-to-date. For example and in one embodiment, all acknowledged transactions should be accessible from any active mirror if it is upgraded to a primary role. In one embodiment, mirrors take active part in verifying transactions as next write are applied at the last offset where the last transaction left off.

In one embodiment, a replicated log mirror consistently guarantees for data at rest. In this embodiment, at any given point, the following consistency in-variants hold for logical logs that belong to a replicated log: (i) a replicated log will have at least 1 logical log assigned to it; (ii) a replicated log will always have only 1 of its logical log marked as primary (e.g., the primary count for a replicated log is 1); and (iii) a replicated log may have 0 or N logical log acting as mirrors for the replicated log.

In one embodiment, all mirrors replicas can be classified as IN_SYNC with the primary, in which case the mirrors are in sync with the active mirror of the vNode or OUT_OF_SYNC with the mirror. In one embodiment, all IN_SYNC mirrors along with the primary mirror form an active mirror set (AMS). In one embodiment, all but last transaction group for all logical logs in the AMS are binary identical. That is similar numbered transaction groups from any mirror can be used to serve data. In one embodiment, mutation to replicated logs is appended. For example and in one embodiment, a transaction group is only written once for a replicated log.

In one embodiment, there is at most one mutation in flight. The mutation that is in flight can: (i) Succeed with all replicated logical logs responding; (ii) Fail with all involved logical log responding about the failure; or (iii) Fail/Succeed without the involved logical log responding the failure. For (iii), this can happen if the replicated log takes in a mutation request but crashes before acknowledging success or failure.

In one embodiment, at any given point in time, logic at the storage pool either: knows the status of the last mutation (e.g. if the last issued mutation was responded to); or it does not know the status of the last operation (e.g. if its the first mutation to be initiated or if the last mutation went unacknowledged). In the later case, the StorFS system assumes that the state of the last mutation to be indeterminate. In this embodiment, tip re-sync logic takes care of this indeterminate state.

Figure 10:
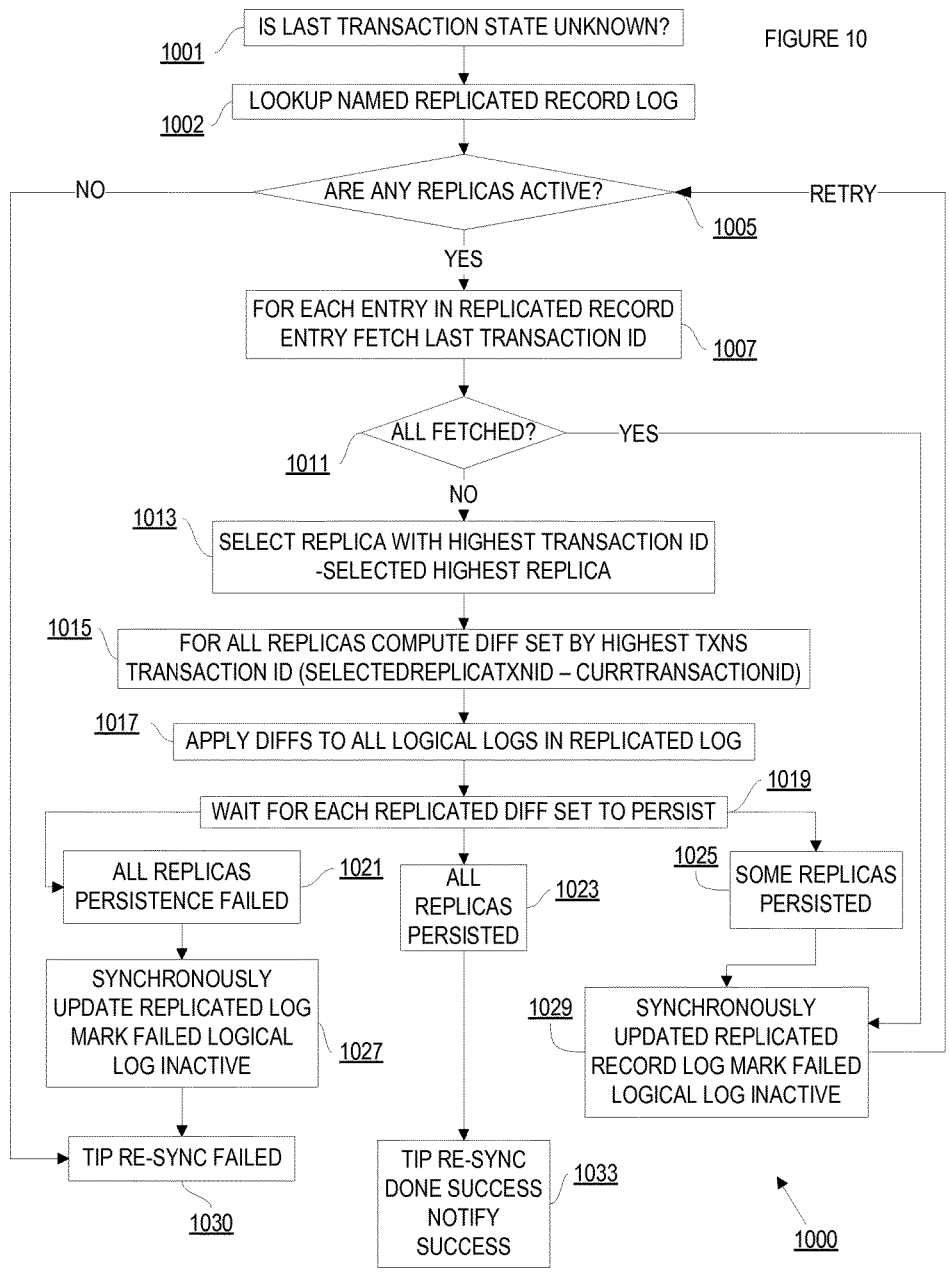
FIG. 10 is a flow diagram of one embodiment of a process to perform a tip re-sync.

In one embodiment, the tip re-sync logic applies for the scenarios where the state of the mutation is not known or is indeterminate. In one embodiment, a mutation is change to distributed log. In this embodiment, one change is performed at a time, e.g. appending a transaction batch to the tail of the log. This includes state on first write/mutation after primary election. FIG. 10 is a flow diagram of one embodiment of a process 1000 to perform a tip re-sync. In one embodiment, the distributed object layer 218 performs process 1000 for a tip re-sync. In FIG. 10, process 1000 begins by determining if the last transition state is unknown at block 1001. If the last transaction state is known, process 1000 returns. If the last transaction state is unknown, at block 1002, process 1000 looks up the named replicated record log. At block 1005, process 1000 determines if there are any replicas that are active. If there are no replicas that are active, execution proceeds to block 1030 below. If there are active replicas, process 1000 performs a processing loop for each entry in the replicated record entry at block 1007. In one embodiment, process 1000 fetches the last transaction ID for each entry in the replicated record entry. At block 1011, process 1000 determines if all of the replicated record entries are fetched. If the replicated entries are fetched, process 1000 proceeds to block 1029. If not all of the replica record entries are fetched, process 1000 selects the replica with the highest transaction ID at block 1013. In one embodiment, process 1000 selects the highest replica ID. At block 1015, process 1000 performs a processing loop for all the replicas by computing the difference set by the highest transaction ID. In one embodiment, process 1000 calculates the difference for the logical logs against a baseline logical log. In this embodiment, a baseline logical log includes a set of transactions that are present in the baseline logical log and not present the logical log that is to be tip re-synced. At block 1017, process 1000 applies the differences to the logical logs in the replicated log. In one embodiment, process 1000 applies the missing transactions to the logical logs that are lagging from the selected baseline.

At block 1019, process 1000 waits for each replicated difference set to persist. In addition, at block 1019, process 1000 determines how many of the replica persistences succeeded. In one embodiment, all the replicas could be persistent, some of the replicas could fail at being persistent, and all of the replicas persistence could fail. If all replicas are persistent, at block 1023, execution proceeds to block 1033 below. At block 1025, some of the replicas persistence have failed and some persisted and execution proceeds to block 1029 below. At block 1021, process 1000 determines that all of the replica persistence have failed. Execution proceeds to block 1027.

At block 1021, process 1000 synchronously updates the replicated record log, marks failed the logical log as inactive. Execution proceeds to block 1030 below. At block 1029, process 1000 synchronously updates the replicated record log and marks failed logical log as inactive. Execution proceeds to block 1005 above, where the tip re-sync is retried. At block 1033, process 900 the tip re-sync is done and a success and notifies the client of the success. At block 1030, process 1000 notes that tip re-sync has failed.

The StorFS system can make an effort roll forward with respect to transaction updates. In one embodiment, under certain scenarios, rolling forward in not an option as the replicated log may roll backward. For example and in one embodiment, if the mirror/primary that had the latest transaction group crashes and never comes back up, the tip re-sync logic will have to apply what is left of the AMS. This is a non-fatal case, as the roll back is guaranteed not be acknowledged to the caller.

In one embodiment, the storage pool provides for a re-sync service as part of the storage pool services 495. In this embodiment, the re-sync service is provided using three base services: (i) fast copy service( ), that can re-sync mirrors at a binary level, as mirrors are binary compatible, where multiple of these transaction group copies are issued in parallel; and (ii) freeze replicated log( ), holds all incoming updates and resolves/flushes pending transaction group updates, where the flush guarantees that replicated log state is not in flux (even for the last transaction group) when it returns; and (iii) thaw replicated log( ) that undoes what the freeze step does.

Figure 11:
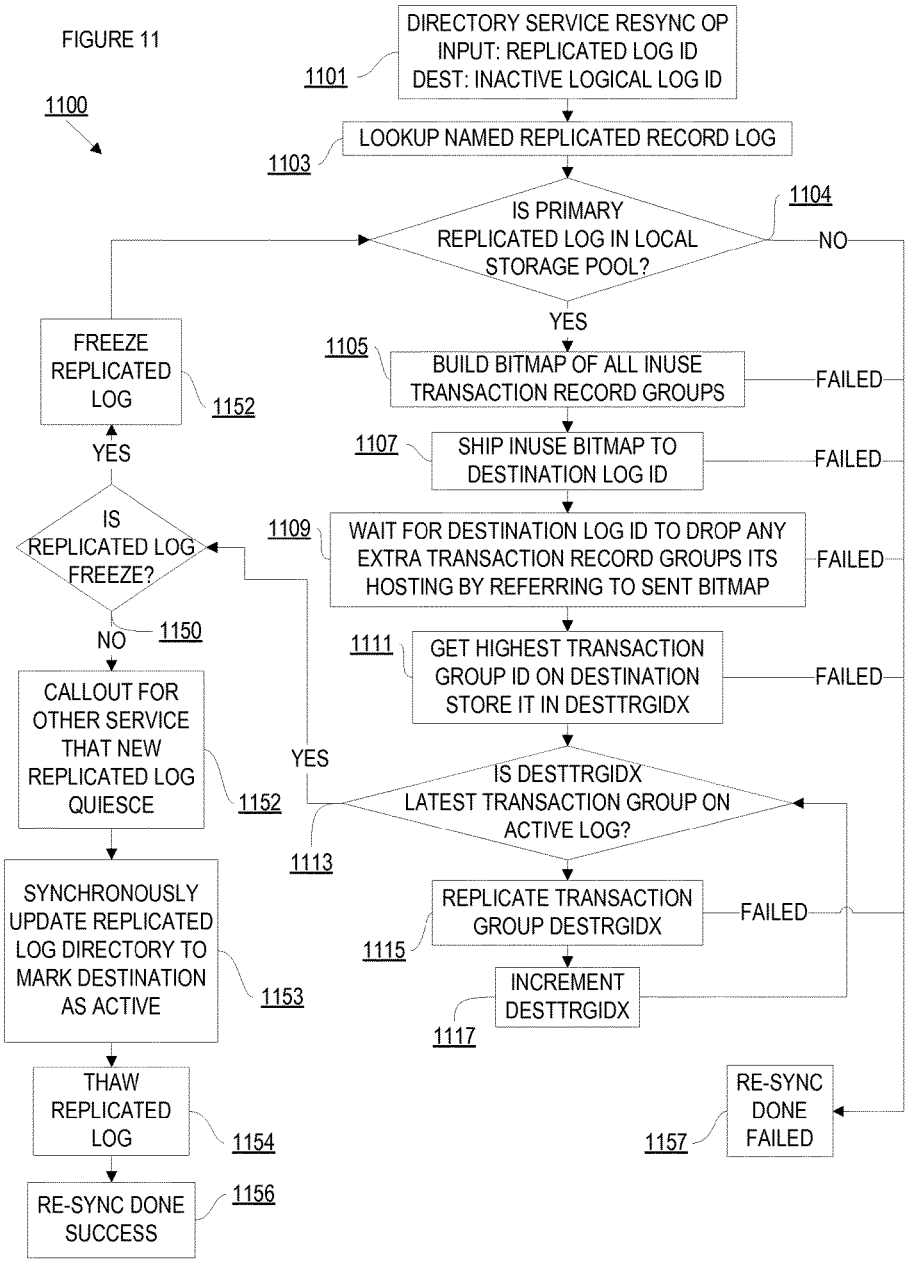
FIG. 11 is a flow diagram of one embodiment of a process to perform a re-sync.

The composition of a replicated log can be changed, so that it constituent logical logs that are placed on storage containers in a fashion that load-balances capacity/bandwidth and other forms of utilization parameters. Such re-balance can be achieved by adding/removing a single replica at time. FIG. 11 is a flow diagram of one embodiment of a process 1100 to perform a re-sync. In one embodiment, process 1100 performs two passes on the replicated log. A first pass (blocks 1104-1113) determine the differences between the replicas. A second pass (blocks 1153-1156) to update the replicated log. In one embodiment, the distributed object layer 218 performs process 1100 for a re-sync. In FIG. 11, process 1100 begins by receiving the directory service re-sync operation at block 1101. At block 1103, process 1100 looks up the named replicated record log. At block 1104, process 1100 determines if the primary replicated log is in the local storage pool. If the primary replicated log is not in the local storage pool, execution proceeds to block 1157 below. If the primary replicated log is in the local storage pool, at block 1105, process 1100 builds a bitmap of all in use transaction record groups. If process 1100 fails the build, execution proceed to block 1157 below. At block 1107, process 1100 sends the in-use bitmap to the destination log ID. In one embodiment, process 1100 sends the set of transaction groups identified currently active at the primary to the re-sync destination. If process 1100 fails the shipping, execution proceed to block 1157 below. Process 1100 waits for the destination log ID to drop any extra transaction record groups it is hosting by referring to the sent bitmap at block 1109. If the wait fails, execution proceeds to block 1157 below. At block 1111, process 1100 gets the highest transaction group ID on the destination store that is stored in the destination transaction record group, destTrgIdx. If the get fails, execution proceeds to block 1157 below. Process 1100 determines if the destTrgIdx is the latest transaction group on an active log at block 1113. In one embodiment, in case of a stale mirror re-sync, process 1100 sends out new transaction groups. In case of a new mirror or mirror re-silvering/scrubbing, process 1100 copies or sends out all transaction groups. If the destTrgIdx is the latest transaction group on the active log, execution proceeds to block 1150. If destTrgIdx is not the latest transaction group on the active block, process 1100 replicates the destTrgIdx at block 1115. If the replicate fails, execution proceeds to block 1157 below. At block 1117, process 1100 increments destTrgIdx. Execution proceeds to block 1113 above.

At lot 1150, process 1100 determines if the replicated log should be frozen. If so, process 1100 freezes updates to the replicated log at block 1152. Execution proceeds to block 1104 above. If the replicated blog is not frozen, at block 1152, process 1100 performs a call out for other services that replicate log quiesce. In one embodiment, the replicated log has reached a quiesced phase and the new logical log asynchronously added to the replicate log directory entry. At block 1153, process 1100 synchronously updates the replicated log directory to a market destination as active. In one embodiment, process 1100 copies over the transaction groups that were issued after process 1100 initiated the freeze and before the freeze returned. In one embodiment, this delta copy is also done using the same re-sync mechanism with the difference of replicated log frozen. Once the destination logical is re-synced under freeze, process 1100 synchronously updates the replicated log directory to mark the destination as active. Process 1100 thaws the replicated log at block 1154. At block 1156, process 1100 marks the re-sync done and a success. At block 1157, process 1100 marks the re-sync done and a failure. In one embodiment, the re-sync process provides for the freeze application programming interface (API) that which can form the basis of updates requiring a consistent view of the replicated log. For example and in one embodiment, the call out 1154 is used to perform many other operations other than re-sync.

Figure 12:
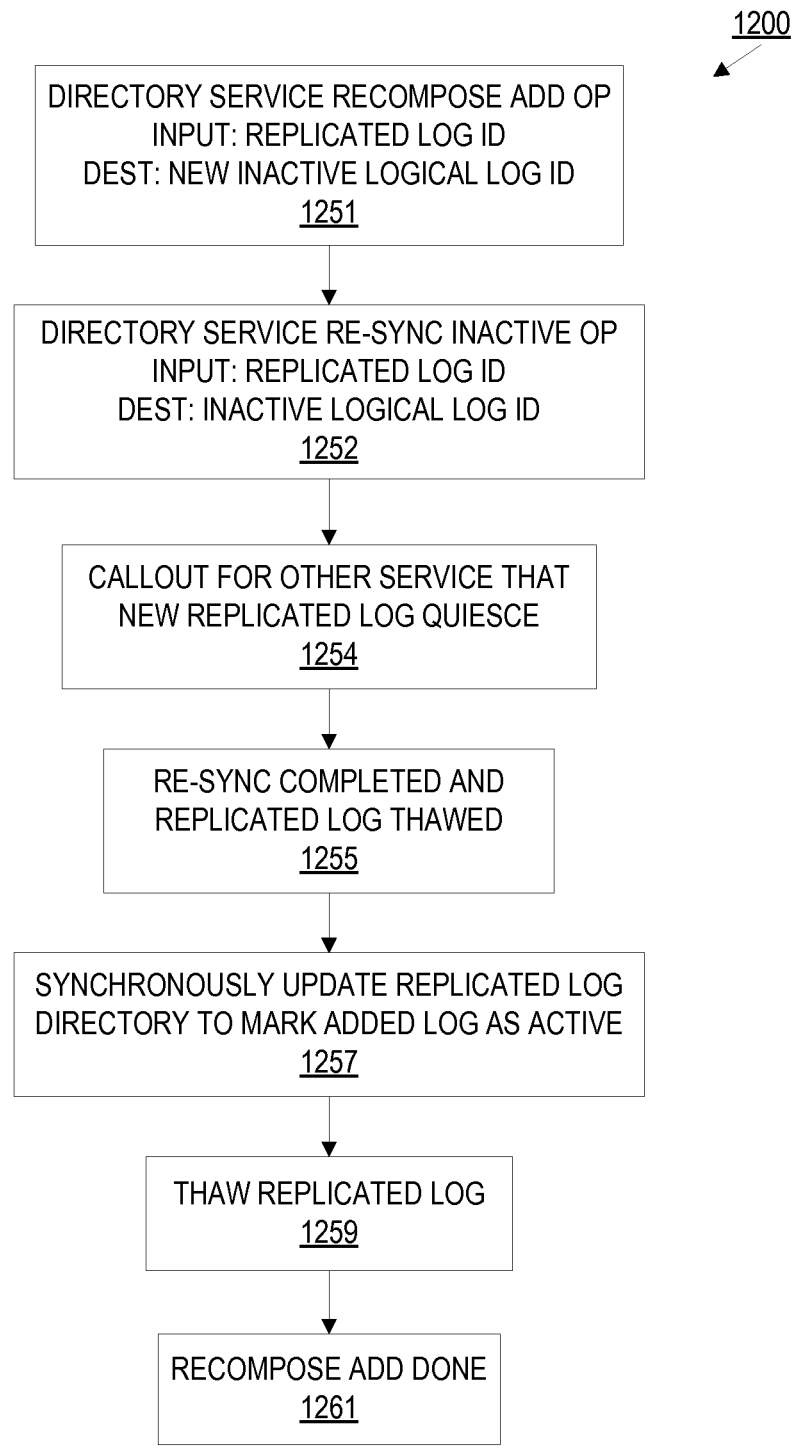
FIG. 12 is a flow diagram of one embodiment of a process to perform a recompose add replica using re-sync.

FIG. 12 is a flow diagram of one embodiment of a process 1200 to perform a recompose add replica using re-sync. In one embodiment, a recompose add operation request is received by the storage pool container that is hosting the primary logical log for the replicated log. In this embodiment, a new empty logical log is provided as the destination log for the re-sync algorithm. In one embodiment, the distributed object layer 218 performs process 1200 for a recompose add replica using re-sync operation. In FIG. 12, process 1200 begins by receiving either a directory service recompose add operation at block 1251 or a directory service re-sync inactive operation at block 1252. In one embodiment, at either block, process 1200 receives as an input the replicated log ID. At block 1254, process 1200 performs a call out for other services. In one embodiment, the replicated log has reached a quiesced phase and the new logical log asynchronously added to the replicate log directory entry. At block 1255, process 1203 determines the re-sync is completed and replicated log is thawed. Process 1200 synchronously updates the replicated log directory to mark an added log as active. At block 1259, process 1200 thaws the replicated log. In one embodiment, the frozen replicated log is thawed to include the added logical log in further updates. Process 1200 completes the recompose add operation at block 1261.

Figure 13:
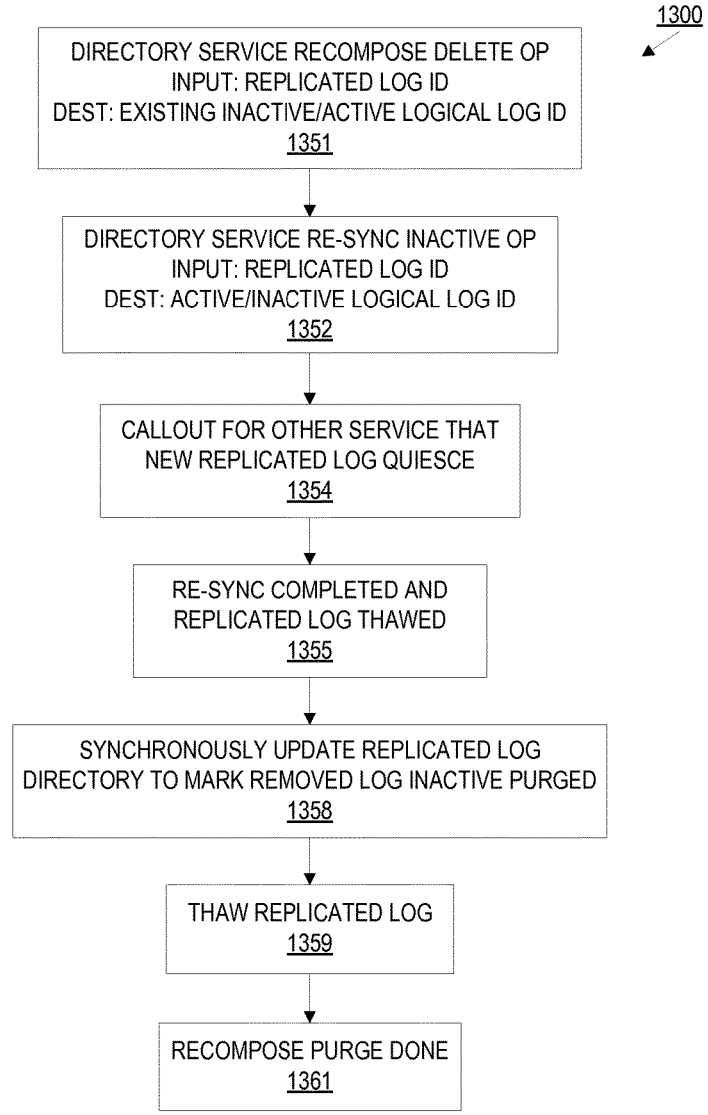
FIG. 13 is a flow diagram of one embodiment of a process to perform a recompose delete/purge replica using re-sync.

The remove/purge logical log flowchart is similar to the add work flow, except in quiesced 512 stage an exiting mirror is removed from the logical log directory entry. FIG. 13 is a flow diagram of one embodiment of a process 1300 to perform a recompose delete/purge replica using re-sync. In one embodiment, a recompose delete/purge operation request is received by the storage pool container that is hosting the primary logical log for the replicated log. In one embodiment, the distributed object layer 218 performs process 1300 for a recompose delete/purge replica using re-sync operation. In FIG. 13, process 1300 begins by receiving either a directory service recompose delete operation at block 1351 or a directory service re-sync inactive operation at block 1352. In one embodiment, at either block, process 1300 receives as an input the replicated log ID. At block 1354, process 1300 performs a call out for other services. In one embodiment, the replicated log has reached a quiesced phase and the new logical log asynchronously added to the replicate log directory entry. At block 1355, process 1303 determines the re-sync is completed and replicated log is thawed. Process 1300 synchronously updates the replicated log directory to mark a removed log as inactive and purged. At block 1359, process 1300 thaws the replicated log. In one embodiment, the frozen replicated log is thawed to include the added logical log in further updates. Process 1300 completes the recompose purge operation at block 1361.

Figure 14:
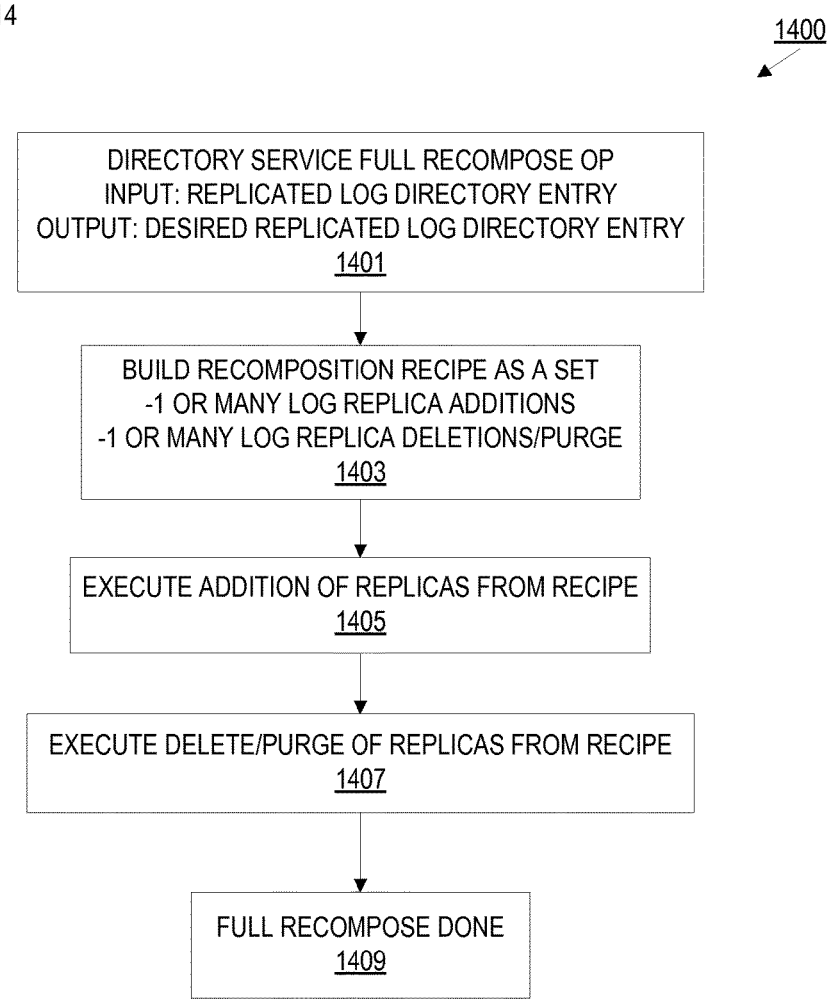
FIG. 14 is a flow diagram of one embodiment of a process to perform a recompose replicated log full transform.

FIG. 14 is a flow diagram of one embodiment of a process 1400 to perform a recompose replicated log full transform. In one embodiment, process 1400 alters a full composition of a replicated log by applying a set of logical log additions following by a set of replicate log purges. In one embodiment, the distributed object layer 218 performs process 1400 for a recompose replicated log full transform operation. In FIG. 14, process 1400 receives a directory service full recompose operation at block 1401. In one embodiment, the input for this operation is a replicated log directory entry. The output of process 1400 is the desired replicated directory log entry. In one embodiment, the full recomposition is described to the storage pool that is hosting the primary replica. At block 1403, process 1400 builds a recomposition recipe as a set. In one embodiment there can be one or more log replica additions and/or one or more log replica deletions and/or purges. For example and in one embodiment, a full transformation can be achieved by applying single transformations one by one. In this example, say the change is from $\{1, 2, 3\} \rightarrow \{1, 4, 5\}$. This change can be made by: (i) add 4 $\{1, 2, 3, 4\}$; (ii) add 5 $\{1, 2, 3, 4, 5\}$; (iii) delete 2 $\{1, 3, 4, 5\}$; and (iv) delete 3 $\{1, 4, 5\}$. In this embodiment, the numbers refer to the mirrors of a vNode. In this embodiment, mirrors "4" and "5" are added and mirrors "2" and "3" are removed. In one embodiment, process 1400 creates a recipe for the transformation as a series of node additions and node deletions. At block 1405, process 1400 executes the addition of the replicas from the recipe. Process 1400 executes a delete and/or purge of the replicas from the recipe at block 1407. At block 1407, process 1400 determines that the full recompose is done.

Figure 15:
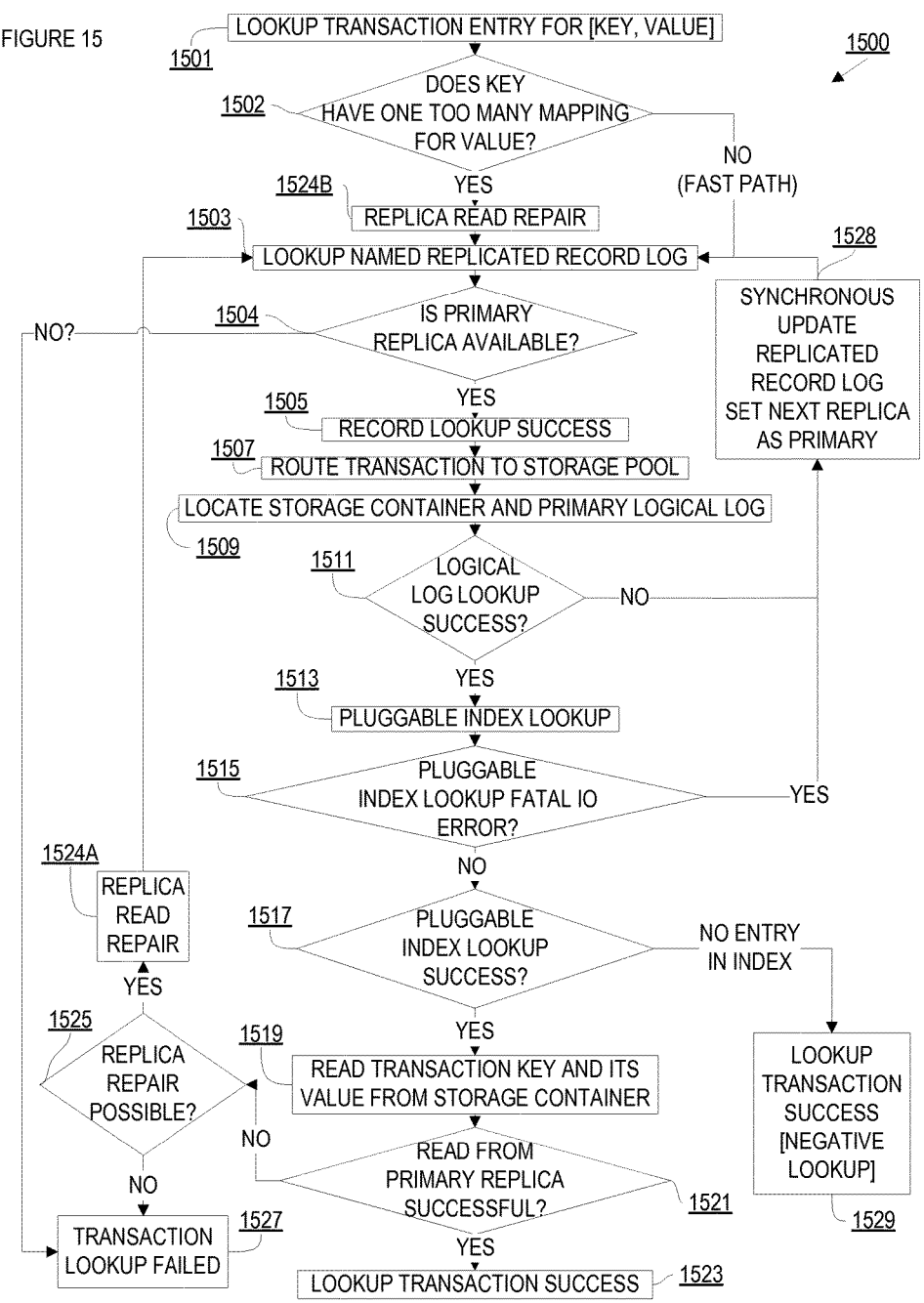
FIG. 15 is a flow diagram of one embodiment of a process to read a path.

FIG. 15 is a flow diagram of one embodiment of a process 1500 to read a path. In one embodiment, the read path is optimistic and lockless, in which process 1500 attempts a read on an inconsistent state for keys which have one to one key→value mapping. In one embodiment, this optimization that works from a correctness point of view give the following three properties: (i) if an inconsistent read returns an older transaction entry, this is are fine, as the value for the old key is also the same; (ii) clients cannot ask for transactions which are in-flight and whose state is not determinate; and (iii) for keys which have one to many mapping from key to value, need tips to be re-synced before the keys is served. The latter is to avoid getting older version of the value that map to the same keys. In one embodiment, the distributed object layer 218 performs process 1500 to read a path.

In FIG. 15, process 1500 begins by receiving a lookup transaction entry at block 1501. In one embodiment, the lookup transaction entry is an entry that includes a key-value pair that is used to locate the transaction entry. In one embodiment, any storage pool can be asked to lookup any transaction given its key in the system. In this embodiment, the routing algorithm similar to write and routes the key get to the storage pool that is hosting the primary logical log. If the key has one-to-one mapping to values, process 1500 takes the fast path and skips the replica read repair.

At block 1502, process 1500 determines if the key has one-to-many mapping for the value. In one embodiment, a one-to-many mapping means the many different values have the same key. If the key is a one-to-one mapping for the value execution proceeds to block 1503 below. If the key is a one to many mapping for the value, process 1500 preforms a replica read repair at block 1524*b*. In one embodiment, the replica read repair is further described in FIG. 16 below. At block 1503, process 1500 looks up the named replicated record log. At lot 1504, process 1500 determines if the primary replica is available. If the primary replica is not available, execution proceeds to block 1527 below. If the primary replica is available, process 1500 determines if the record look up is a success at block 1505. At block 1507, process 1500 routes the transaction to the storage pool. Process 1500 locates a storage container and the primary logical log at block 1509. Process 1500 determines if the logical log lookup was a success at block 1511.

If the logical log look up is not a success, execution proceeds to block 1528 below. If the logical log look up is a success, process 1500 performs a pluggable index look up at block 1513. About 1515, process 1500 determines if that pluggable index lookup returns a fatal I/O error. In one embodiment, process 1500 consults the pluggable index on the storage pool to do the key lookup. If this look up returns fatal I/O error, execution proceeds to block 1528 below. If the lookout did not return a fatal I/O error, at block 1517, process 1500 determines if the pluggable index lookup was a success. In one embodiment, the pluggable index lookup resolves which LBA stores the key. If there is no entry in the index and the lookup was not a success, execution proceeds to block 1529 below. If the lookout was a success, process 1500 reads the transaction key and associated value from the storage container at block 1519. At block 1521, process 1500 determined if the read from the primary replica was successful. If the read was successful, process 1500 determines that the look up transaction was a success. If the read was not successful, execution proceeds to block 1525 below.

At block 1525, process 1500 determines if the replica repair is possible. In one embodiment, the replica repair attempts are bounded by the number of replicas available that are checked in step 1025. The replica repair is not possible, execution proceeds to block 1527 below. If the replica repair is possible, at block 1524*a*, process 1500 performs a replica read prepare. In one embodiment, the replica read repair is further described in FIG. 16 below. Execution proceeds to block 1503 above. At block 1527, process 1500 determines that the transaction lookup failed. At this point, process 1500 would have lost the replicas. At block 1529, process 1500 determines that the lookout transaction was a success and with a negative lookup. At block 1528, process 1500 performs a synchronous update on the replicated record log. In addition, process 1500 sets the next replica as the primary.

Figure 16:
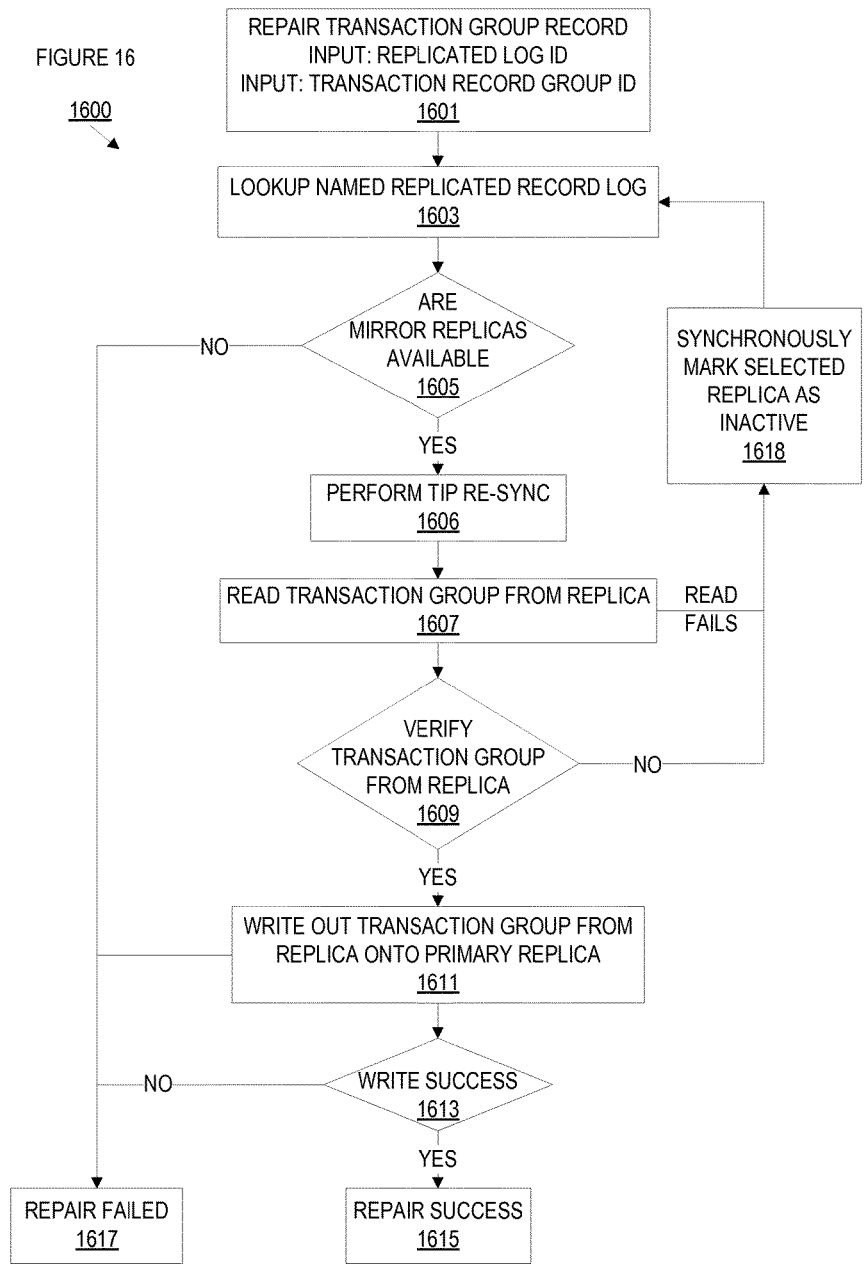
FIG. 16 is a flow diagram of one embodiment of a process to perform a read path repair.

FIG. 16 is a flow diagram of one embodiment of a process 1600 to perform a read repair. In one embodiment, process 1500 performs process 1600 to do a read repair as described in blocks 1524A-B above. In one embodiment, the read repair is the catch all work flow to fix all errors by consulting replicas. In this embodiment, the following types of issues are fixed by this: storage container corruptions at the hardware persistence level; mirror divergence, due to software bugs; tip re-sync to assure that the most recent copy of the key which has one to many mapping to value; and transient errors due to the fact that keys are being moved around. In one embodiment, a read repair is required as to support a virtualization layer that allows the keys to be moved around within the logical log to another place within the storage container. In one embodiment, these mutations go through an ordering: (a) populate new keys at the new location within the storage container; (b) change the pluggable index on the container to map to the new location; and (c) delete/free old location for keys. In one embodiment, if process 1600 performs an index lookup at (a), but then by the time process 1600 reads the old location is freed at (c), the lookup will fail. In this embodiment, a re-lookup is guaranteed to succeed as before the old location is freed and the new location is already persisted at (b). In one embodiment, the distributed object layer 218 performs process 1600 to do a read repair.

In FIG. 16, process 1600 begins by receiving repair transaction group record at block 1601. In one embodiment, the input for the read repair includes a replicated log ID and a transaction record group ID. In one embodiment, the transaction record group ID is optional. If transaction group ID is not available, the StorFS system performs a full repair that repairs all transaction groups. At block 1603, process 1600 looks up the named replicative record log in order to determine which replicas can be consulted. At block 1605, process 1600 determines if there are any mirror replicas available. If there are no mirror replicas available, execution proceeds to block 1617 below. If there is a mirror replica available, at block 1606, process 1600 performs a tip-resync. In one embodiment, process 1600 performs a tip-resync as described in FIG. 10 above. At block 1607, process 1600 reads the transaction group from the replica from one of the active replicas. If the read fails, execution proceeds to block 1618 below. At block 1609, process 1600 verifies the transaction group from the replica. If process 1600 cannot verify the transaction group, execution proceeds to block 1618 below. If process 1600 can verify the transaction group, at block 1611, process 1600 writes out the transaction group from the replica onto the primary replica for the failing replica. At block 1613, process 1600 determines if that write was a success. If the write was not a success, execution proceeds to block 1617 below. If the write was a success, at block 1615, process 1600 determines that the read repair was a success. At block 1617, process 1600 determines that the read repair has failed. At block 1618, process 1600 synchronously marks the selected replica as inactive. Execution proceeds to block 1603 above.

Figure 17:
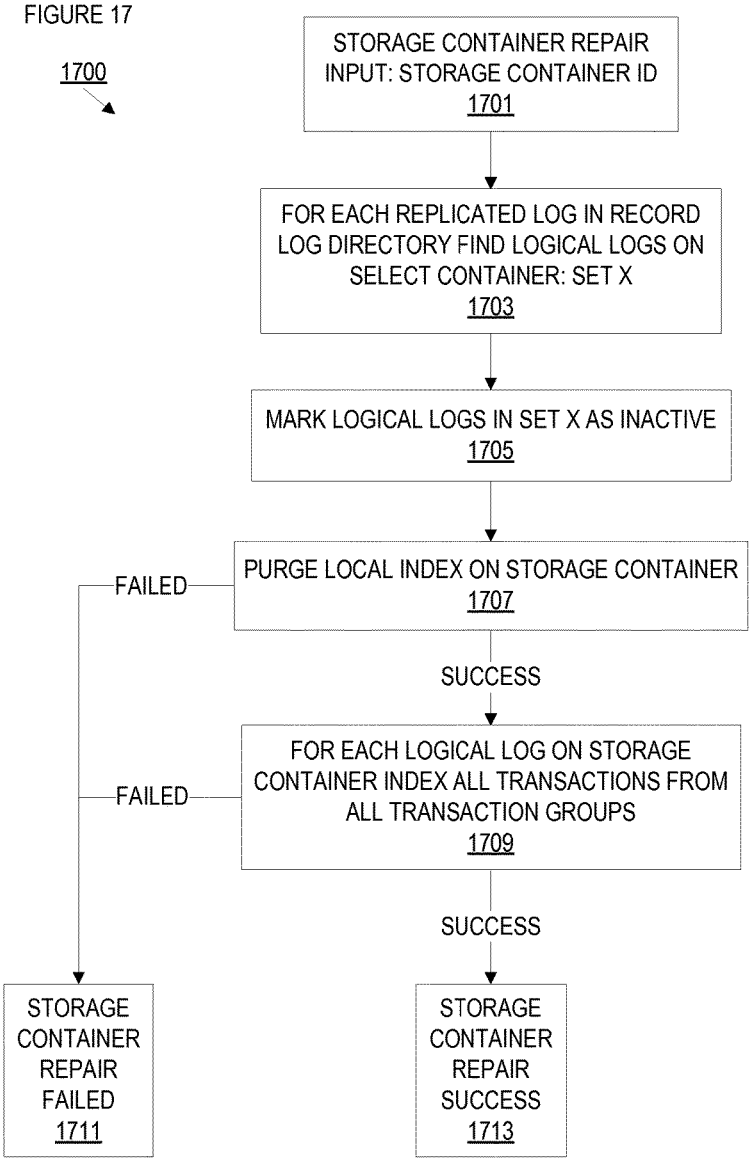
FIG. 17 is a flow diagram of one embodiment of a process to perform a storage container repair.

FIG. 17 is a flow diagram of one embodiment of a process 1700 to perform a storage container repair. In one embodiment, the distributed object layer 218 performs process 1700 for a storage container repair operation. In FIG. 17, process 1700 begins by receiving a storage container repair request at block 1701. In one embodiment, the input for this request is the storage container ID. At block 1703, for each replicated logging the record log directory, process 1700 finds the logical logs on a select container. In one embodiment, this set of logical logs is set X. At block 1705, process 1700 marks logical logs in set X as inactive. Process 1707 purges local index on the storage container at block 1707. If this purge fails, execution proceeds to block 1711 below. If the purge was a success, at block 1709, for each logical log on storage container, process 1700 indexes all the transactions from all the transaction groups. If the indexing fails, execution proceeds to block 1711 below. If indexing was a success, process 1700 determines that the storage container repair was a success of block 1713. At block 1711, process 1700 determines that the storage container repair failed.

Figure 18:
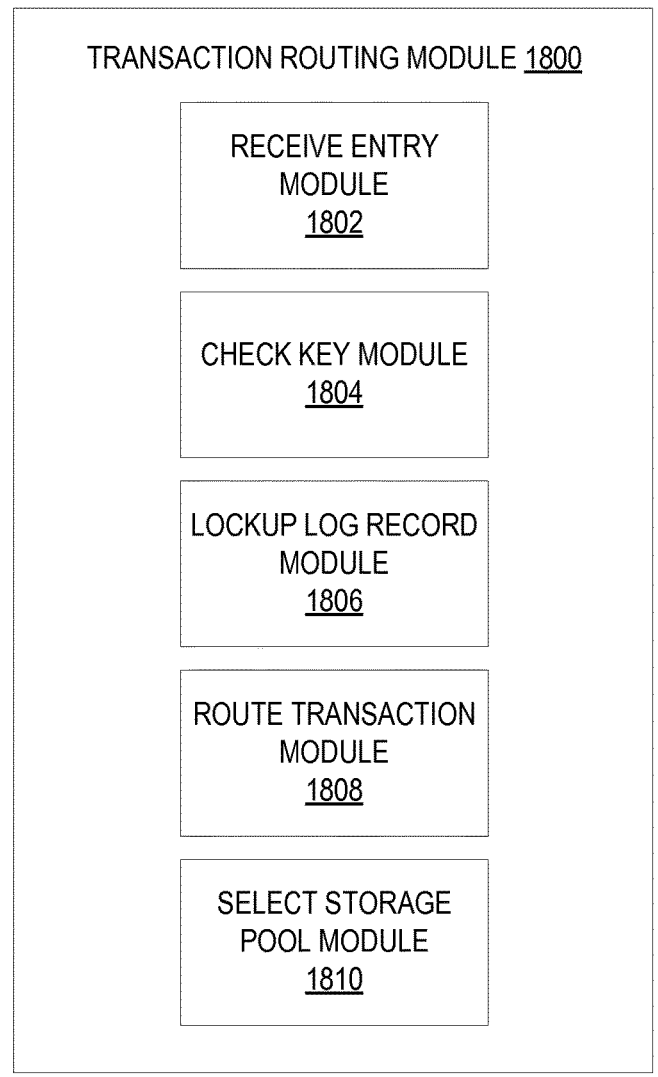
FIG. 18 is a block diagram of a transaction routing module that performs transaction routing.

FIG. 18 is a block diagram of a transaction routing module 1800 that performs transaction routing. In one embodiment, the transaction routing module 1800 includes a receive entry module 1802, check key module 1804, lockup log record module 1806, route transaction module 1808, and select storage pool module 1810. In one embodiment, the receive entry module 1802 receives the transaction entry as described above in FIG. 8, block 801. The check key module 1804 determines if the key is a replicated or named key as described above in FIG. 8, blocks 804 and 805. The lookup log record module 1806 looks up a named replicated record log as described above in FIG. 8, block 808. The route transaction module 1808 routes a transaction to a storage pool as described above in FIG. 8, block 815. The select storage pool module selects a local storage pool as described above in FIG. 8, blocking 813.

Figure 19:
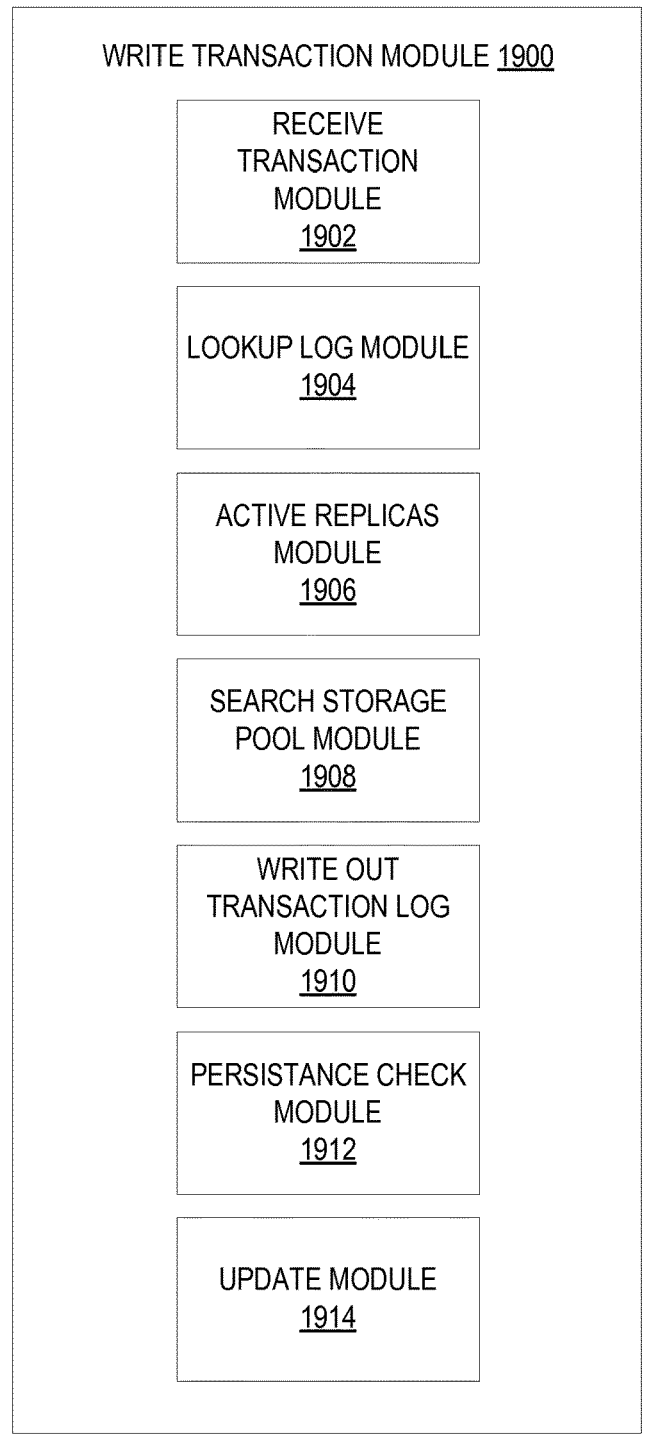
FIG. 19 is a block diagram of a write transaction module that performs writing/storing a transaction record.

FIG. 19 is a block diagram of a write transaction module 1900 that performs writing/storing a transaction record. In one embodiment, the write transaction module 1900 includes a received transaction module 1902, lookup lock module 1904, active replicas module 1906, search storage pool module 1908, write out transaction log module 1910, persistence check module 1912, and update module 1914. In one embodiment, the receive transaction module receives a transaction at a local storage pool as described above in FIG. 9, block 901. The lookup lock module 1904 looks up a named replicated record log as described in FIG. 9, block 903. The active replicas module 1906 determines if there are any active replicas as described above in FIG. 9, block 906. The search storage pool module 1908 searches a local storage pool as described above in FIG. 9, block 907. The write out transaction log module 1910 writes out a transaction log for each replicated and record entry as described above in FIG. 9, block 911. The persistence check module 1912 persists transaction log entries as described above in FIG. 9, block 913. The update module performs an asynchronous update as described above in FIG. 9, blocks 920 and 921.

Figure 20:
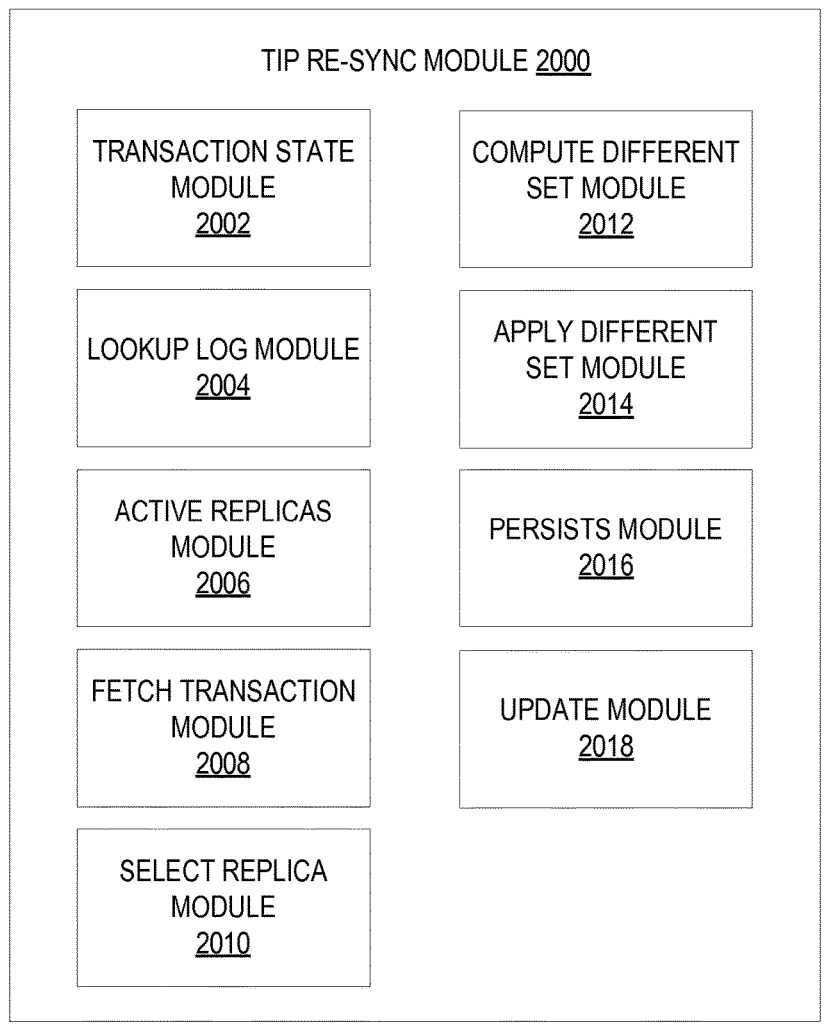
FIG. 20 is a block diagram of a tip re-sync module that performs a tip re-sync.

FIG. 20 is a block diagram of a tip re-sync module 2000 that performs a tip re-sync. In one embodiment, the tip re-sync module 2000 includes a transaction state module 2002, lookup log module 2004, active replicas module 2006, fetch transaction module 2008, select replica module 2010, compute different set module 2012, apply different set module 2014, persists module 2016, and update module 2018. In one embodiment, the transaction state module 2002 determines if the last transaction state is unknown as described above in FIG. 10, block 1001. The lookup log module 2004 looks up a named replicated record log as described above in FIG. 10, block 1002. The active replicas module 2006 determines if there are any active replicas as described above in FIG. 10, block 1005. The fetch transaction module 2008 fetches the last transaction identifier as described above in FIG. 10, block 1007. The select replica module 2010 selects a replica with the highest transaction identifier as described above in FIG. 10, block 1013. The computer different set module 2012 computed difference that as described above in FIG. 10, block 1015. The apply different set module 2014 applies the different set to all logical logs in the replicated log as described above in FIG. 10, block 1017. The persists module 2016 waits for each replicated different set to persist as described above in FIG. 10, block 1019. The update module 2018 performs a synchronous update as described above in FIG. 10, blocks 1027 and 1029.

Figure 21:
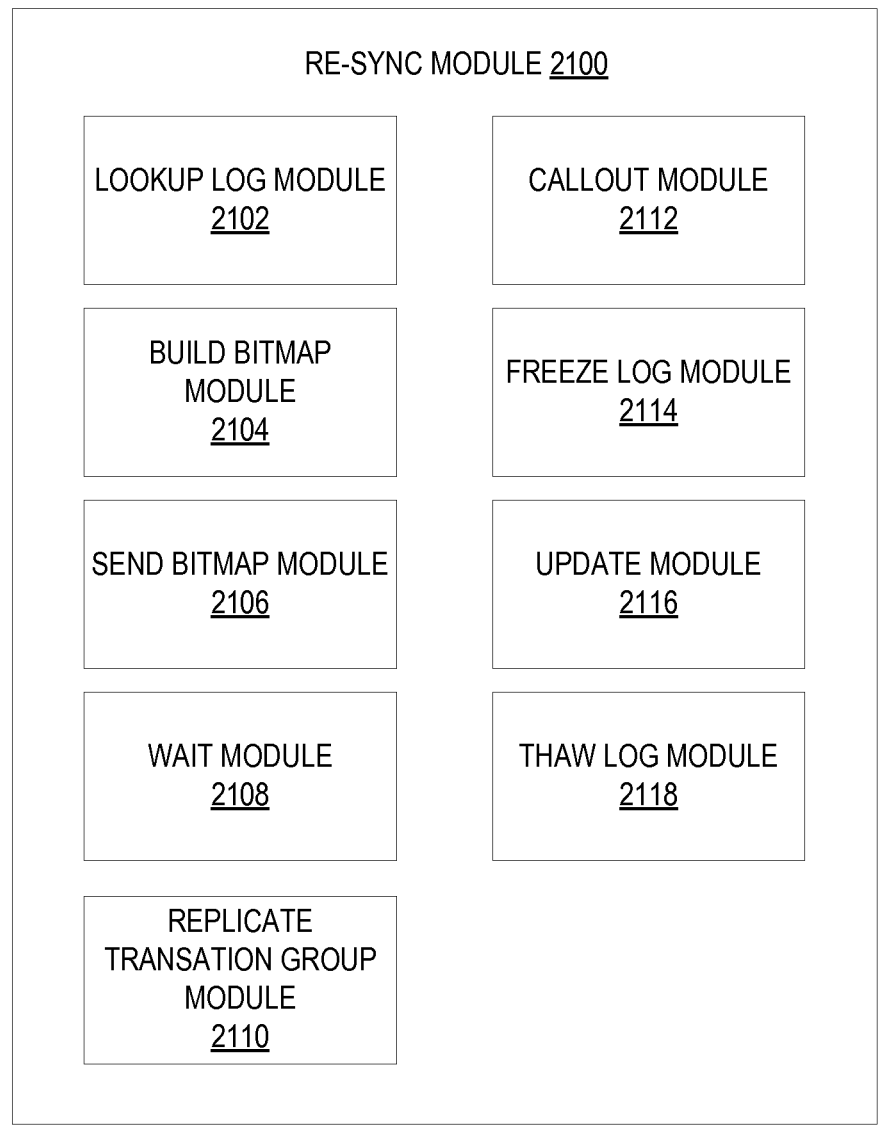
FIG. 21 is a block diagram of a re-sync module that performs a re-sync.

FIG. 21 is a block diagram of a re-sync module 2100 that performs a re-sync. In one embodiment, the re-sync module 2100 includes a lookup log module 2102, build bitmap module 2104, send bitmap module 2106, wait module 2108, replicate translation group module 2110, callout module 2112, freeze log module 2114, update module 2116, and thaw log module 2118. In one embodiment, the lookup log module 2102 looks up a named replicated record log as described above in FIG. 11, block 1103. The build bitmap module 2104 builds a bitmap as described above in FIG. 11, block 1105. The send bitmap module 2106 sends a bitmap as described above in FIG. 11, block 1107. The wait module 2108 waits for the destination log identifier to drop any extra transaction record groups as described above in FIG. 11, block 1109. The replicate translation group module 2110 replicates the transaction group as described above in FIG. 11, block 1115. The callout module 2112 calls out for other services as described above in FIG. 11, block 1151. The freeze log module 2114 freezes the replicated log as described above in FIG. 11, block 1152. The update module 2116 performs a synchronous update as described above in FIG. 11, block 1153. The thaw log module 2118 thaws the replicated log as described above in FIG. 11, block 1154.

Figure 22:
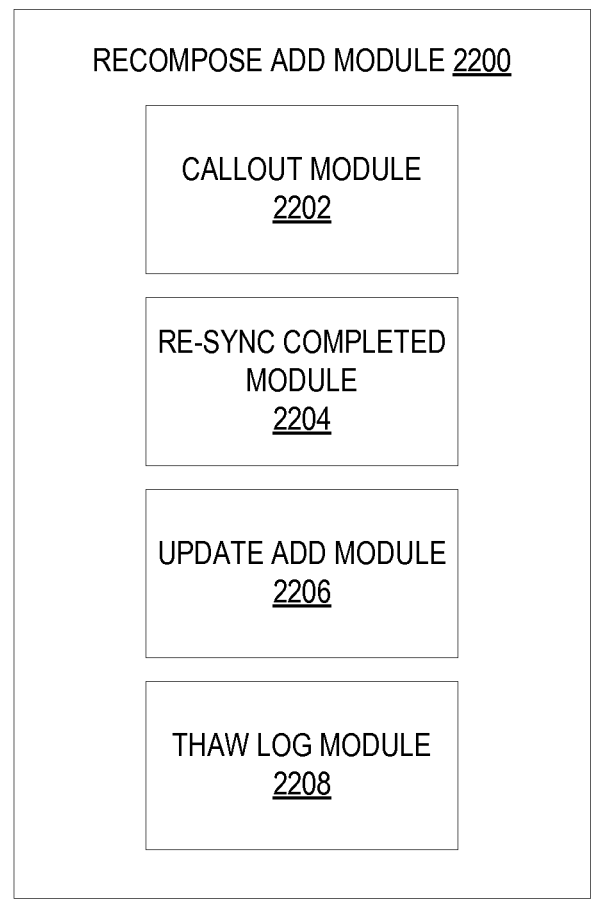
FIG. 22 is a block diagram of a recompose add module that performs a recompose add replica using re-sync.

FIG. 22 is a block diagram of a recompose add module 2200 that performs a recompose add replica using re-sync. In one embodiment, the recompose add module 2200 includes a callout module 2202, re-sync completed module 2204, update add module 2206, and thaw log module 2208. In one embodiment, the a callout module 2202 calls out for other services as described above in FIG. 12, block 1254. The re-sync completed module 2204 determines if the re-sync is completed and the replicated log is thawed as described above in FIG. 12, block 1255. The update add module 2206 synchronously updates the replicated log directory as described above in FIG. 12, block 1257. The thaw log module 2208 thaw the replicated log as described above in FIG. 12, block 1259.

Figure 23:
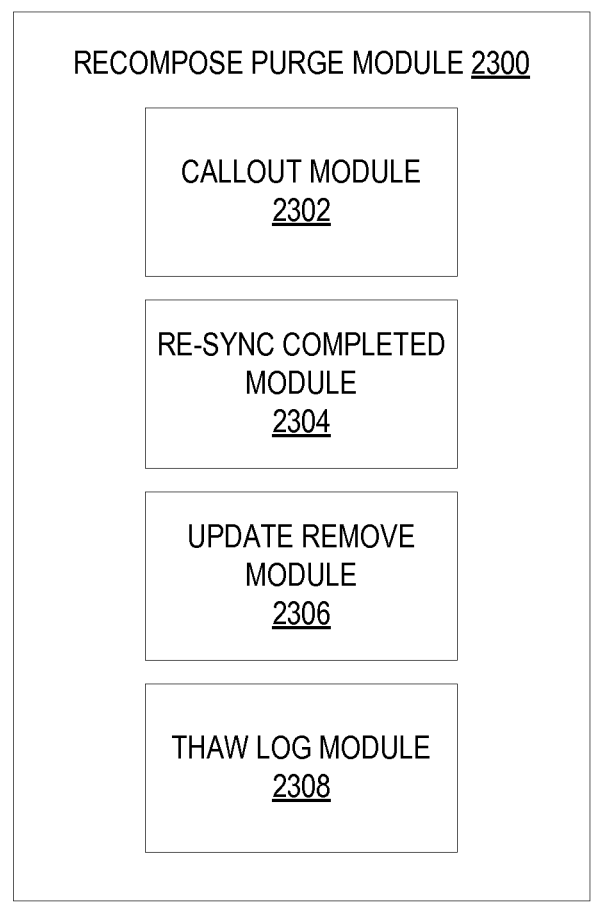
FIG. 23 is a block diagram of a recompose purge module that performs a recompose delete/purge replica using re-sync.

FIG. 23 is a block diagram of a recompose purge module 2300 that performs a recompose delete/purge replica using re-sync. In one embodiment, the recompose add module 2300 includes a callout module 2302, re-sync completed module 2304, update remove module 2306, and thaw log module 2308. In one embodiment, the a callout module 2302 calls out for other services as described above in FIG. 13, block 1354. The re-sync completed module 2304 determines if the re-sync is completed and the replicated log is thawed as described above in FIG. 13, block 1355. The update remove module 2306 synchronously updates the replicated log directory as described above in FIG. 13, block 1357. The thaw log module 2308 thaw the replicated log as described above in FIG. 13, block 1359.

Figure 24:
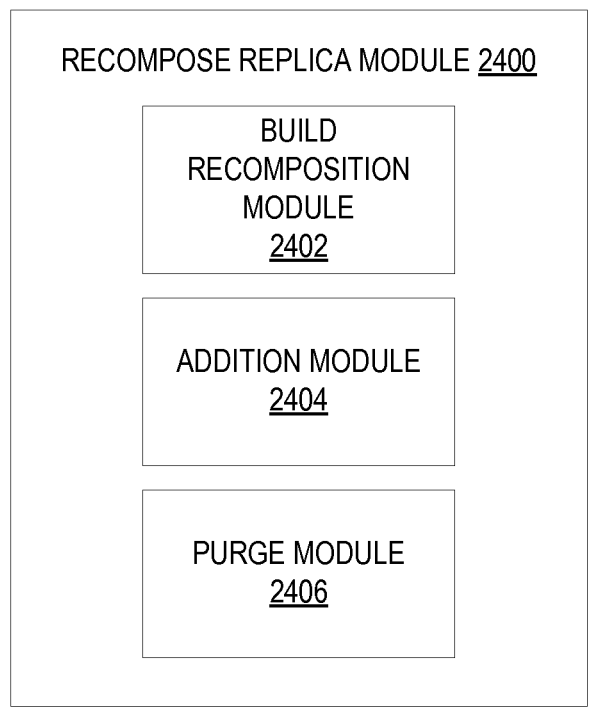
FIG. 24 is a block diagram of a recompose replica module that performs a recompose replicated log full transform.

FIG. 24 is a block diagram of a recompose replica module 2400 that performs a recompose replicated log full transform. In one embodiment, the recompose replica module 2400 includes a build recomposition module 2402, addition module 2404, and purge module 2406. In one embodiment, the build recomposition module 2402 builds a recomposition recipe as described above in FIG. 14, block 1403. The addition module 2404 executes an addition of replicas as described above in FIG. 14, block 1405. The purge module 2406 executes a delete/purge of replicas as described above in FIG. 14, block 1407.

Figure 25:
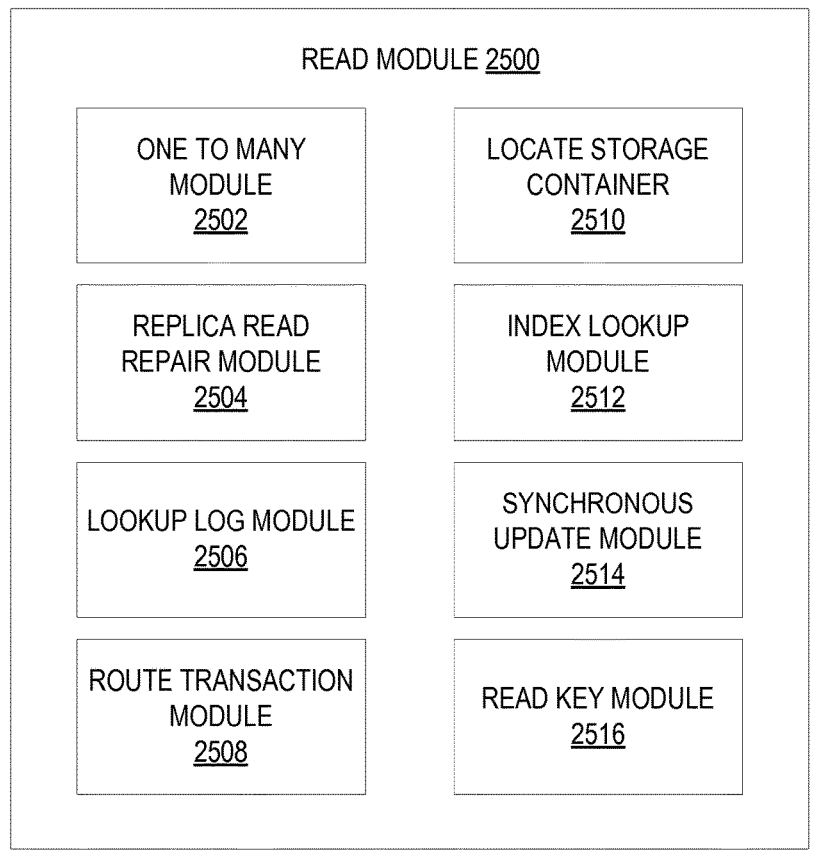
FIG. 25 is a block diagram of a read module that reads a path.

FIG. 25 is a block diagram of a read module 2500 that reads a path. In one embodiment, the read module 2500 includes a one to many module 2502, replica read repair module 2504, lookup log module 2506, route transaction module 2508, locate storage container 2510, index lookup module 2512, synchronous update module 2514, and read key module 2516. In one embodiment, the one to many module 2502 determines if the key has a one to many mapping replica as described above in FIG. 15, block 1502. The read repair module 2504 does a replica read repair as described above in FIG. 15, block 1524b. The lookup log module 2506 performs a lookup for a named replicated record log as described above in FIG. 15, block 1503. The route transaction module 2508 routes the transaction to a storage pool as described above in FIG. 15, block 1507. The locate storage container 2510 locates the storage container as described above in FIG. 15, block 1509. The index lookup module 2512 does a pluggable index lookup as described above in FIG. 15, block 1515. The synchronous update module 2514 performs a synchronous update as described above in FIG. 15, block 1528. The read key module 2516 reads a transaction key as described above in FIG. 15, block 1519.

Figure 26:
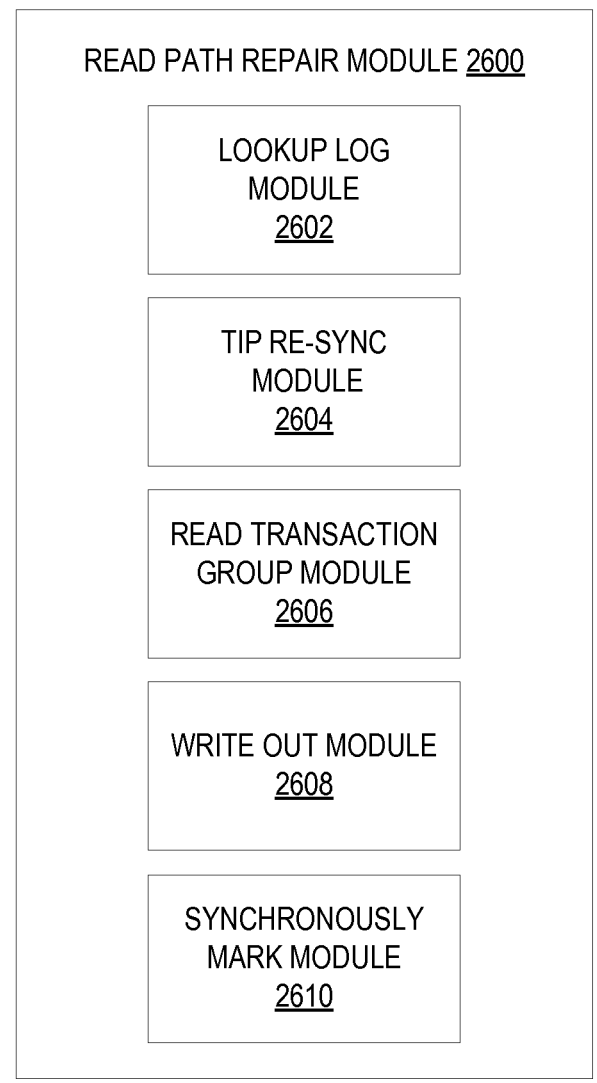
FIG. 26 is a block diagram of a read path repair module that performs a read path repair.

FIG. 26 is a block diagram of a read path repair module 2600 that performs a read path repair. In one embodiment, the read path repair module 2600 includes a lookup log module 2602, tip re-sync module 2604, read transaction group module 2606, write out module 2608, and synchronously mark module 2610. In one embodiment, the lookup log module 2602 looks up a named replicated record log as described above in FIG. 16, block 1603. The tip re-sync module 2604 performs a tip-re-sync as described above in FIG. 16, block 1606. The read transaction group module 2606 reads a transaction group form a replica as described above in FIG. 16, block 1609. The write out module 2608 writes out a transaction group as described above in FIG. 16, block 1611. The synchronously mark module 2610 synchronously marks a selected replica as described above in FIG. 16, block 1618.

Figure 27:
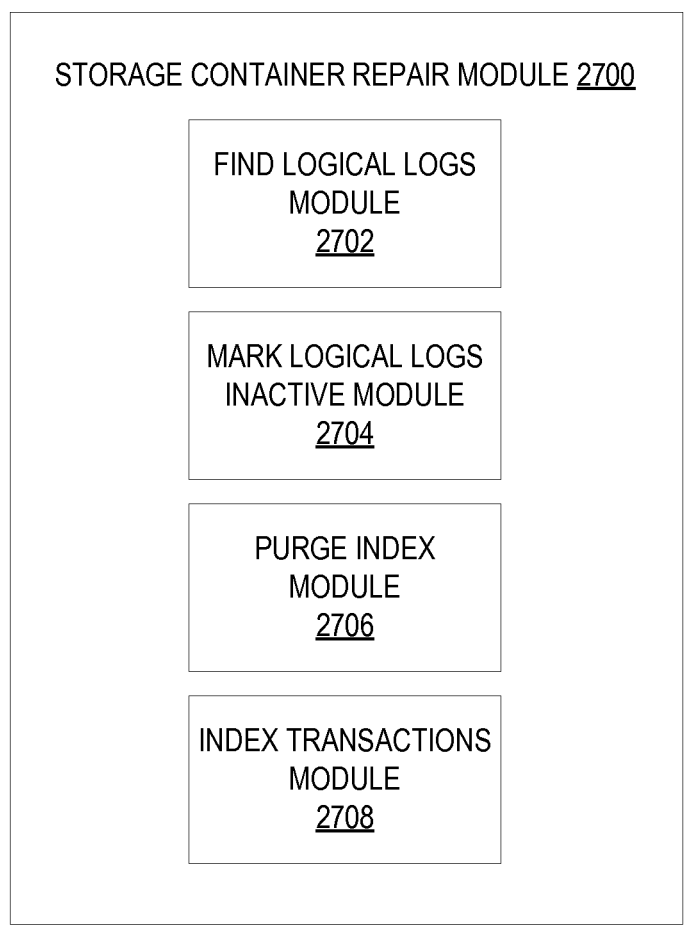
FIG. 27 is a block diagram of a storage container repair module that performs a storage container repair.

FIG. 27 is a block diagram of a storage container repair module 2700 that performs a storage container repair. In one embodiment, the storage container repair module 2700 includes a find logical logs module 2702, mark logical logs inactive module 2704, purge index module 2706, and index transactions module 2708. In one embodiment, the find logical logs module 2702 find logical logs on a select container as described above in FIG. 17, block 1703. The mark logical logs inactive module 2704 marks the logical logs as inactive as described above in FIG. 17, block 1705. The purge index module 2706 purges a local index as described above in FIG. 17, block 1707. The index transactions module 2708 indexes the transactions form the transactions in a group as described above in FIG. 17, block 1709.

Figure 28:
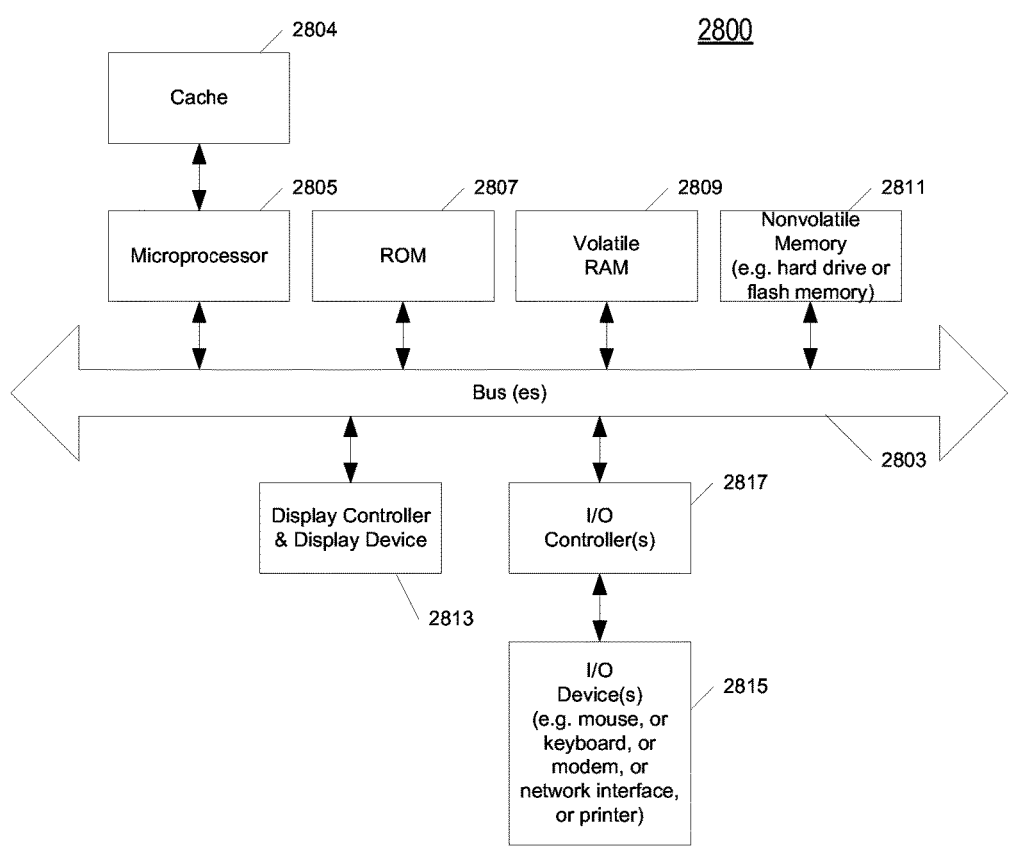
FIG. 28 illustrates one example of a typical computer system, which may be used in conjunction with the embodiments described herein.

FIG. 28 shows one example of a data processing system 2800, which may be used with one embodiment of the present invention. For example, the system 2800 may be implemented including a physical server 102A-C as shown in FIG. 1. Note that while FIG. 28 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 28, the computer system 2800, which is a form of a data processing system, includes a bus 2803 which is coupled to a microprocessor(s) 2805 and a ROM (Read Only Memory) 2807 and volatile RAM 2809 and a non-volatile memory 2828. The microprocessor 2805 may retrieve the instructions from the memories 2807, 2809, 2811 and execute the instructions to perform operations described above. The bus 2803 interconnects these various components together and also interconnects these components 2805, 2807, 2809, and 2811 to a display controller and display device 2813 and to peripheral devices such as input/output (I/O) devices which may be mice, keyboards, modems, network interfaces, printers and other devices which are well known in the art. Typically, the input/output devices 2815 are coupled to the system through input/output controllers 2817. The volatile RAM (Random Access Memory) 2809 is typically implemented as dynamic RAM (DRAM), which requires power continually in order to refresh or maintain the data in the memory.

The mass storage 2811 is typically a magnetic hard drive or a magnetic optical drive or an optical drive or a DVD RAM or a flash memory or other types of memory systems, which maintain data (e.g. large amounts of data) even after power is removed from the system. Typically, the mass storage 2811 will also be a random access memory although this is not required. While FIG. 28 shows that the mass storage 2811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 2803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "transmitting," "computing," "routing," "performing," "generating," "communicating," "reading," "writing," "transferring," "updating," "scanning," "compacting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to store a transaction entry in a distributed storage system, wherein storage controller functions of the distributed storage system are separated from distributed storage system storage media, the distributed storage system storage media including a plurality of storage pools, the method comprising:
   receiving the transaction entry in a first storage pool of the plurality of storage pools of the distributed storage system, wherein the transaction entry is associated with storage controller functions of the distributed storage system that indicates an object is to be stored in at least one logical block address space of the distributed storage system storage media, the at least one logical block address space being defined over one or more storage containers of a plurality of storage containers associated with the plurality of storage pools;
   looking up a transaction log to store the transaction entry, the transaction log is associated with a second storage pool of the plurality of storage pools, wherein the second storage pool is separate from the first storage pool, and wherein the transaction log is a log that is a history of actions executed by storage controller functions of the distributed storage system and includes one or more logical logs, wherein the logical log is a log defined over a logical block address space;
   routing the transaction entry to the second storage pool, wherein the second storage pool stores the transaction entry in the transaction log; and
   replicating the transaction log to another transaction log across a plurality of fault domains, wherein the plurality of fault domains comprises the plurality of storage pools and/or the plurality of storage containers; and
   wherein a failure of a component for the transaction log associated with the second storage pool does not affect the another transaction log replicated across the plurality of fault domains.

2. The non-transitory machine-readable medium of claim 1, wherein the transaction entry includes a key-value pair, with the key being an identifier for the value and the value is an object that is stored in the distributed storage system.

3. The non-transitory machine-readable medium of claim 2, wherein the key is selected from the group consisting of a named and an unnamed key.

4. A non-transitory machine-readable medium having executable instructions to cause one or more processing units to perform a method to read a transaction entry in a distributed storage system, wherein storage controller functions of the distributed storage system are separated from distributed storage system storage media, the distributed storage system storage media including a plurality of storage pools, the method comprising:
   receiving the transaction entry, from a client, to be read in a first storage pool of the plurality of storage pools of the distributed storage system, wherein the transaction entry is associated with storage controller functions of the distributed storage system that indicates an object is to be read from at least one logical block address space of the distributed storage system storage media, the at least one logical block address space being defined over one or more storage containers of a plurality of storage containers associated with the plurality of storage pools;
   looking up a transaction log to read the transaction entry, the transaction log is associated with a second storage pool of the plurality of storage pools, wherein the second storage pool is separate from the first storage pool, and wherein the transaction log is a log that is a history of actions executed by storage controller functions of the distributed storage system and includes one or more logical logs, wherein the logical log is a log defined over a logical block address space;

routing the transaction entry to the second storage pool, wherein the second storage pool reads the object indicated by the transaction entry;

receiving the object;

wherein the transaction log is replicated to another transaction log across a plurality of fault domains, wherein the plurality of fault domains comprises the plurality of storage pools and/or the plurality of storage containers; and wherein a failure of a component for the transaction log associated with the second storage pool does not affect the another transaction log replicated across the plurality of fault domains.

5. The non-transitory machine-readable medium of claim 4, further comprising:

sending the object to the client.

6. A non-transitory machine-readable medium having executable instructions to cause one or more processing units to perform a method to store a transaction entry in a distributed storage system, wherein storage controller functions of the distributed storage system are separated from distributed storage system storage media, the distributed storage system storage media including a plurality of storage pools, the method comprising:

receiving the transaction entry at a second storage pool that is routed from a first storage pool of the plurality of storage pools of the distributed storage system, wherein the second storage pool is separate from the first storage pool, wherein the transaction entry is associated with storage controller functions of the distributed storage system that indicates an object is to be stored in at least one logical block address space of the distributed storage system storage media, the at least one logical block address space being defined over one or more storage containers of a plurality of storage containers associated with the plurality of storage pools;

searching the second storage pool of the plurality of storage pools for a plurality of transaction logs to store the transaction entry, wherein each of the plurality of transaction logs is a log that is a history of actions executed by storage controller functions of the distributed storage system and includes one or more logical logs wherein the logical log is a log defined over a logical block address space;

for each transaction log in the plurality of transaction logs, storing the transaction entry in that transaction log; and replicating the transaction log to another transaction log across a plurality of fault domains, wherein the plurality of fault domains comprises the plurality of storage pools and/or the plurality of storage containers; and wherein a failure of a component for the transaction log associated with the second storage pool does not affect the another transaction log replicated across the plurality of fault domains.

7. The non-transitory machine-readable medium of claim 6, further comprising at least one transaction group, wherein the transaction group is a group of transaction log entries within the transaction log.

8. The non-transitory machine-readable medium of claim 7, wherein the another transaction log replicated across the plurality of fault domains comprises at least one logical log including one or more replicas of the at least one transaction group.

9. A non-transitory machine-readable medium having executable instructions to cause one or more processing units to perform a method to do a read repair in a distributed storage system, wherein storage controller functions of the distributed storage system are separated from distributed storage system storage media, the distributed storage system storage media including a plurality of storage pools, the method comprising:

receiving a repair transaction group request, the repair transaction group indicating a transaction group to repair, wherein the transaction group is a group of transaction log entries associated with storage controller functions of the distributed storage system within a transaction log, the transaction log is a log that is a history of actions executed by storage controller functions of the distributed storage system and includes one or more logical logs, wherein the logical log is a log defined over a logical block address space of the distributed storage system storage media;

wherein the transaction log is replicated to at least one replicated transaction log across a plurality of fault domains so that a failure of a component for the transaction log does not affect the replicated transaction log replicated across the plurality of fault domains;

wherein the replicated transaction log comprises at least one logical log including one or more replicas of transaction groups;

determining if there is a mirror replica available for the transaction group within the replicated transaction log;

if there is a mirror replica available, repairing the transaction group from the mirror replica.

10. The non-transitory machine-readable medium of claim 9, wherein the repairing the transaction group comprises:

performing a tip-resync on the transaction group, wherein the tip-resync fixes an indeterminate state of a transaction log entry of the transaction group.

11. The non-transitory machine-readable medium of claim 10, wherein the indeterminate state of the transaction log entry is an unknown change to the transaction log entry.

12. The non-transitory machine-readable medium of claim 10, wherein the performing a tip-resync comprises:

determining a replica from the mirror replica that has the highest transaction identifier;

determining a difference set between the transaction group and the replica; and applying a missing transaction from the difference set to the transaction group.

13. The non-transitory machine-readable medium of claim 9, wherein the repair transaction group is received as an exception detected by the distributed storage system, the exception selected from the group consisting of a storage container corruption, mirror divergence, and a transient error.

14. The non-transitory machine-readable medium of claim 9, wherein a transaction log entry includes a key-value pair, with the key being an identifier for the value and the value is an object that is stored in the distributed storage system.

15. The non-transitory machine-readable medium of claim 1, further comprising at least one transaction group, wherein the transaction group is a group of transaction log entries within the transaction log.

16. The non-transitory machine-readable medium of claim 15, wherein the another transaction log replicated across the plurality of fault domains comprises at least one logical log including one or more replicas of the at least one transaction group.

* * * * *